(12) United States Patent
Tamagaki

(10) Patent No.: US 11,221,828 B2
(45) Date of Patent: Jan. 11, 2022

(54) SUPPORT DEVICE AND SUPPORT PROGRAM

(71) Applicant: OMRON Corporation, Kyoto (JP)

(72) Inventor: Yutaka Tamagaki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/643,578

(22) PCT Filed: Jan. 22, 2019

(86) PCT No.: PCT/JP2019/001782
§ 371 (c)(1),
(2) Date: Mar. 1, 2020

(87) PCT Pub. No.: WO2019/171794
PCT Pub. Date: Sep. 12, 2019

(65) Prior Publication Data
US 2020/0201605 A1     Jun. 25, 2020

(30) Foreign Application Priority Data

Mar. 7, 2018  (JP) ............................. JP2018-040510

(51) Int. Cl.
*G06F 8/30*  (2018.01)
*G06F 8/41*  (2018.01)

(52) U.S. Cl.
CPC .  *G06F 8/30* (2013.01); *G06F 8/41* (2013.01)

(58) Field of Classification Search
CPC ... G06F 8/30; G06F 8/41; G06F 8/447; G06F 9/4484; G06F 9/45537; G06F 13/102; G05B 19/05
See application file for complete search history.

(56) References Cited

U.S. PATENT DOCUMENTS

| 6,247,067 B1* | 6/2001 | Berliner et al. ...... | G06F 13/102 719/321 |
| 2006/0190935 A1* | 8/2006 | Kielstra et al. ..... | G06F 9/45516 717/148 |
| 2011/0119472 A1* | 5/2011 | Amano ................. | G06F 9/3844 712/239 |

FOREIGN PATENT DOCUMENTS

| JP | H10-083312 A | 3/1998 |
| JP | H11-232118 A | 8/1999 |

(Continued)

OTHER PUBLICATIONS

Tomohiro Kanda, "Hands-On: Ichitara 8 Macro Lesson 5", ASCII, Dec. 1, 1997, vol. 21, No. 12, pp. 429-431, Relevance is indicated in the (translated) ISR/WO mailed on Feb. 26, 2019.

(Continued)

*Primary Examiner* — Wei Y Zhen
*Assistant Examiner* — Mohammed N Huda
(74) *Attorney, Agent, or Firm* — Metrolex IP Law Group, PLLC

(57) ABSTRACT

Compatibility of a callable unit program configuring a user program is provided. A code generator that generates a code having a format executable by a control device from the user program generates an instruction code creating a structure storing association information associating a name of an argument with a value set to the argument with respect to a call expression, and converts the call expression into an instruction code calling the unit program using an identifier of the structure. A value of association information is set to the argument when the association information corresponding to the name of the argument is stored in the structure with respect to each argument of the unit program, an instruction code setting a predetermined value to the argument is generated when the association information is not stored.

9 Claims, 20 Drawing Sheets

(56) References Cited

FOREIGN PATENT DOCUMENTS

JP          2001-331315 A      11/2001
JP          2017-130068 A       7/2017

OTHER PUBLICATIONS

Toshiyuki Omori, "5 Ruby 2.0/Rails 4.0 Comes on the Scene", Nikkei Software, Dec. 24, 2013, vol. 17, No. 3, p. 29, Relevance is indicated in the (translated) ISR/WO mailed on Feb. 26, 2019.
An English translation of the International Search Report("ISR") of PCT/JP2019/001782 dated Feb. 26, 2019.
The Written Opinion("WO") of PCT/JP2019/001782 dated Feb. 26, 2019.
European search report (EESR) dated Nov. 4, 2021 in a counterpart European patent application.

\* cited by examiner

FIG.5

```
START
  :
  :

// FUNCTION DECLARATION ON CALLED SIDE
FUNCTION foo : DINT
  VAR_INPUT  in1     : INT := 0; END_VAR    // INPUT VARIABLE
  VAR_IN_OUT inout2  : DINT;    END_VAR    // INPUT AND OUTPUT VARIABLE
  VAR_OUTPUT out3    : LREAL;   END_VAR    // OUTPUT VARIABLE
END_FUNCTION                                                          } 400

:
  :

// PROGRAM ON CALLER SIDE
PROGRAM bar
  VAR
    a : INT;
    b : INT;
    c : ARRAY[0..9] OF DINT;
    d : LREAL;
    idx : DINT;
  END_VAR                                                             } 500
  // a + b IS ASSIGNED TO INPUT VARIABLE in1, c[idx] IS ASSIGNED TO INPUT AND OUTPUT VARIABLE inout2,
  // d IS ASSIGNED TO OUTPUT VARIABLE out3, AND Foo IS CALLED.
  foo (in1 := a + b, inout2 := c[idx], out3 => d);  ~550

END_PROGRAM
```

600 encompasses 400 and 500.

FIG.6

// CONVERSION INTO CONVENTIONAL (CALLER-SIDE) INTERMEDIATE CODE

```
bar:
   ...
   ADD   tmp1, a, b              // tmp1 = a + b                                                  ⎫
   LOAD  tmp2, &c[idx]           // ACQUIRE ADDRESS OF c[idx]                                     ⎬ 503
   LOAD  tmp3, &tmp4             // IN ORDER TO RECEIVE RESULT OF OUTPUT VARIABLE,                ⎭
                                 // PREPARE TEMPORARY AREA TO ACQUIRE ADDRESS
   ...
   CALL  foo with tmp1, tmp2, tmp3    // foo IS CALLED              ~502
   ...
   STORE tmp4, d                 // VALUE STORED IN TEMPORARY AREA IS STORED IN d    ~504
```
501

FIG.7

```
// CONVERSION INTO CURRENT (CALLED-SIDE) INTERMEDIATE CODE
...
foo:
    LOAD   tmp1, in1        // VALUE OF ARGUMENT in1 IS ACQUIRED
    LOAD   tmp2, inout2     // VALUE (ADDRESS OF AREA ON CALLER SIDE) OF ARGUMENT inout2 IS ACQUIRED     } 542
    LOAD   tmp3, out3       // VALUE (ADDRESS OF TEMPORARY AREA) OF ARGUMENT out3 IS ACQUIRED
    ..
    // PROCESSING OF FUNCTION
    // PROCESSING OF INPUT AND OUTPUT VARIABLE
    LOAD   tmp4, *tmp2      // VALUE OF AREA INDICATED BY inout2 IS ACQUIRED
    ADD    tmp5, tmp4, tmp1 // ARITHMETIC RESULT. IN THIS CASE, ARITHMETIC RESULT IS ILLUSTRATED AS PROCESSING OF ADDING VALUE OF in1   } 543
    STORE  tmp5, *tmp2      // RESULT IS RETURNED TO AREA INDICATED BY inout2
    // PROCESSING OF OTHER FUNCTIONS
    :
    // STORAGE OF VALUE TO OUTPUT VARIABLE
    STORE  tmp6, *tmp3      // STORAGE OF RESULT OF out3 IN TEMPORARY AREA (tmp6 IS AREA WHERE RESULT VALUE SET TO out3 IS STORED)    — 544
    :
    // END OF PROCESSING OF FUNCTION
    RET
```
540

FIG.8

```
//
// CONVERSION INTO INTERMEDIATE CODE BY METHOD FOR SECURING AREA OF ASSOCIATIVE ARRAY FOR EACH CALL (CALLER SIDE)
// bar:
    ...
    ADD   tmp1, a, b              // tmp1 = a + b
    LOAD  tmp2, &c[idx]           // ADDRESS OF c[idx] IS ACQUIRED
    LOAD  tmp3, &tmp4             // TEMPORARY AREA IS PREPARED TO RECEIVE RESULT OF OUTPUT VARIABLE, AND ADDRESS IS ACQUIRED LOAD  tmp5, &tmp1             // ADDRESS OF AREA WHERE VALUE TO INPUT ARGUMENT in1 IS STORED IS ACQUIRED
    LOAD  tmp6, &tmp2             // ADDRESS OF AREA WHERE VALUE (ADDRESS) TO INPUT AND OUTPUT ARGUMENT inout2 IS STORED IS ACQUIRED ALLOC_MAP_AREA tmp7, #3       // AREA OF ASSOCIATIVE ARRAY IS SECURED. AREA WHERE VALUE REPRESENTING TERMINATION IS ADDED TO
                                  // AREA FOR THE NUMBER OF ARGUMENT (IN THIS CASE, THREE) IS SECURED.

SET_ARG_TO_MAP_AREA tmp7, "in1",    tmp5    // ADDRESS OF AREA WHERE VALUE OF ARGUMENT in1 IS STORED IS SET TO ASSOCIATIVE ARRAY
    SET_ARG_TO_MAP_AREA tmp7, "inout2", tmp6    // ADDRESS OF AREA WHERE VALUE (ADDRESS) OF ARGUMENT inout2 IS STORED IS SET TO ASSOCIATIVE ARRAY
    SET_ARG_TO_MAP_AREA tmp7, "out3",   tmp3    // ADDRESS OF AREA WHERE VALUE OF ARGUMENT out3 IS STORED IS SET TO ASSOCIATIVE ARRAY
    SET_TERMINATOR_TO_MAP_AREA tmp7             // VALUE REPRESENTING TERMINATION IS STORED CALL  foo with tmp7           // foo IS CALLED FREE_MAP_AREA tmp7, #3        // ASSOCIATIVE ARRAY AREA IS RELEASED STORE tmp4, d                 // VALUE STORED IN TEMPORARY AREA IS STORED IN d
```

FIG. 9

```
// CONVERSION INTO INTERMEDIATE CODE BY METHOD FOR SECURING AREA OF ASSOCIATIVE ARRAY FOR EACH CALL (CALLED SIDE)
// foo:
    GET_ARG_FROM_MAP_AREA  tmp7, args, "in1"     // ADDRESS OF AREA WHERE VALUE OF ARGUMENT in1 IS STORED IS ACQUIRED FROM ASSOCIATIVE ARRAY
    GET_ARG_FROM_MAP_AREA  tmp8, args, "inout2"  // ADDRESS OF AREA WHERE VALUE (ADDRESS OF CALLER-SIDE AREA) OF ARGUMENT inout2
                                                 //   IS STORED IS ACQUIRED FROM ASSOCIATIVE ARRAY
    GET_ARG_FROM_MAP_AREA  tmp3, args, "out3"    // VALUE (ADDRESS OF TEMPORARY AREA) OF ARGUMENT out3 IS ACQUIRED FROM ASSOCIATIVE ARRAY
    LOAD_IF  tmp7, tmp1, *tmp7, #0   // VALUE OF in1 IS ACQUIRED WHEN tmp7 IS NOT NULL, BUT OTHERWISE DEFAULT VALUE IS SET
    LOAD_IF  tmp8, tmp2, *tmp8, #0   // VALUE (ADDRESS OF CALLER-SIDE AREA) OF inout2 IS ACQUIRED WHEN tmp8 IS NOT NULL,
                                     //   BUT OTHERWISE NULL IS SET
    LOAD_IF  tmp3, tmp3, tmp3, #0    // VALUE IS LEFT AS IT IS WHEN tmp3 IS NOT NULL, BUT OTHERWISE NULL IS SET // PROCESSING OF FUNCTION
    // PROCESSING OF INPUT AND OUTPUT VARIABLE
    LOAD  tmp4, *tmp2      // VALUE OF AREA INDICATED BY inout2 IS ACQUIRED
    ADD   tmp5, tmp4, tmp1 // ARITHMETIC PROCESS. IN THIS CASE, ARITHMETIC PROCESS IS ILLUSTRATED AS PROCESSING OF ADDING VALUE OF in1
    STORE tmp5, *tmp2      // RESULT IS RETURNED TO AREA INDICATED BY inout2
    // PROCESSING OF OTHER FUNCTIONS
    :
    // STORAGE OF VALUE TO OUTPUT VARIABLE
    STORE tmp6, *tmp3      // STORAGE OF RESULT OF out3 IN TEMPORARY AREA (tmp6 IS AREA WHERE RESULT VALUE SET TO out3 IS STORED)
    :
    // END OF PROCESSING OF FUNCTION

RET
```

530 encompasses the full routine; 532 marks the three GET_ARG_FROM_MAP_AREA / LOAD_IF block; 543 marks the LOAD/ADD/STORE block; 544 marks the STORE tmp6, *tmp3 line.

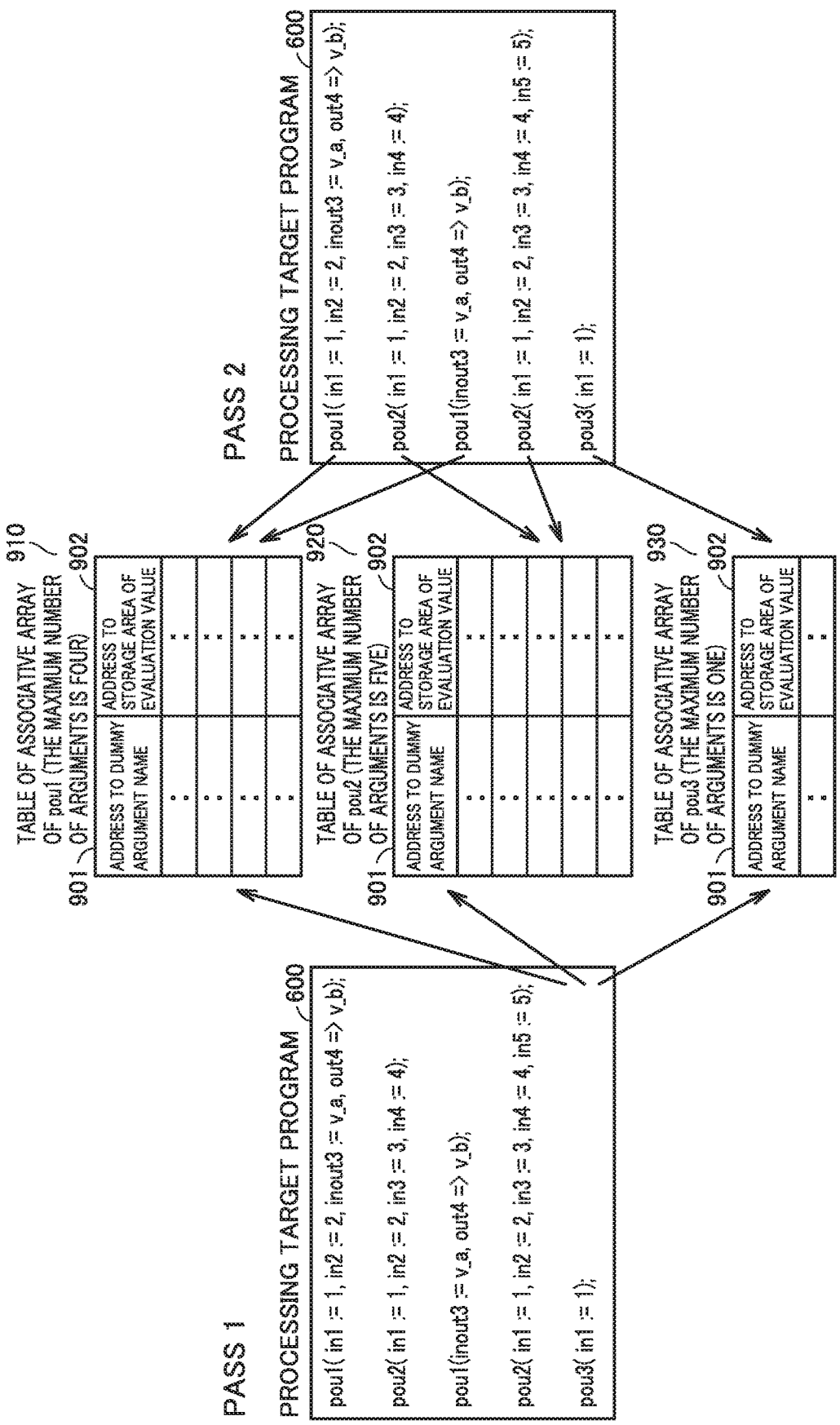
FIG.17 METHOD FOR SECURING AREA OF ASSOCIATIVE ARRAY FOR EACH KIND OF POU (CALLER SIDE)

FIG.18

```
// CONVERSION INTO INTERMEDIATE CODE BY METHOD FOR SECURING AREA OF ASSOCIATIVE ARRAY FOR EACH KIND OF POU (CALLER SIDE)
//
foo_args_area:
524 {  SPACE ((4*2+1)*sizeof_pointer)   // AREA OF ASSOCIATIVE ARRAY IS SECURED. IN THIS CASE, AREA OF ASSOCIATIVE ARRAY IS ACQUIRED AS  } 503
                                        // THE MAXIMUM NUMBER OF ARGUMENTS OF FOUR.
                                        // AREA INCLUDING AREA WHERE VALUE REPRESENTING TERMINATION IS STORED IS ACQUIRED
bar:
       ADD   tmp1, a, b         // tmp1 = a + b
       LOAD  tmp2, &c[idx]      // ADDRESS OF c[idx] IS ACQUIRED
       LOAD  tmp3, &tmp4        // IN ORDER TO RECEIVE RESULT OF OUTPUT VARIABLE, PREPARE TEMPORARY AREA TO ACQUIRE ADDRESS LOAD  tmp5, &tmp1        // ADDRESS OF AREA WHERE VALUE TO INPUT ARGUMENT in1 IS STORED IS ACQUIRED
       LOAD  tmp6, &tmp2        // ADDRESS OF AREA WHERE VALUE (ADDRESS) TO INPUT AND OUTPUT ARGUMENT inout2 IS STORED IS ACQUIRED  } 5210
525 {  SET_ARG_TO_MAP_AREA foo_args_area, "in1",    tmp5   // ADDRESS OF AREA WHERE VALUE TO ARGUMENT in1 IS STORED IS SET TO ASSOCIATIVE ARRAY
       SET_ARG_TO_MAP_AREA foo_args_area, "inout2", tmp6   // ADDRESS OF AREA WHERE VALUE (ADDRESS) TO ARGUMENT inout2 IS STORED IS
                                                           // SET TO ASSOCIATIVE ARRAY
       SET_ARG_TO_MAP_AREA foo_args_area, "out3",  tmp3    // ADDRESS OF AREA WHERE VALUE OF ARGUMENT out3 IS RECEIVED IS SET TO ASSOCIATIVE ARRAY
       SET_TERMINATOR_TO_MAP_AREA foo_args_area            // VALUE REPRESENTING TERMINATION IS STORED                              } 5213

528 {  CALL  foo with foo_args_area       // foo IS CALLED  — 526

CLEAR_MAP_AREA foo_args_area       // ASSOCIATIVE ARRAY AREA IS CLEARED  — 527

STORE tmp4, d                      // VALUE STORED IN TEMPORARY AREA IN d  — 504
```

```
BOOL isArgSpecified(STRING param_name);

param_name : ARGUMENT NAME IS ASSIGNED BY CHARACTER STRING
RETURN VALUE: TRUE WHEN ACTUAL ARGUMENT IS ASSIGNED TO ARGUMENT PARAM_NAME WHEN CALLING
```
570

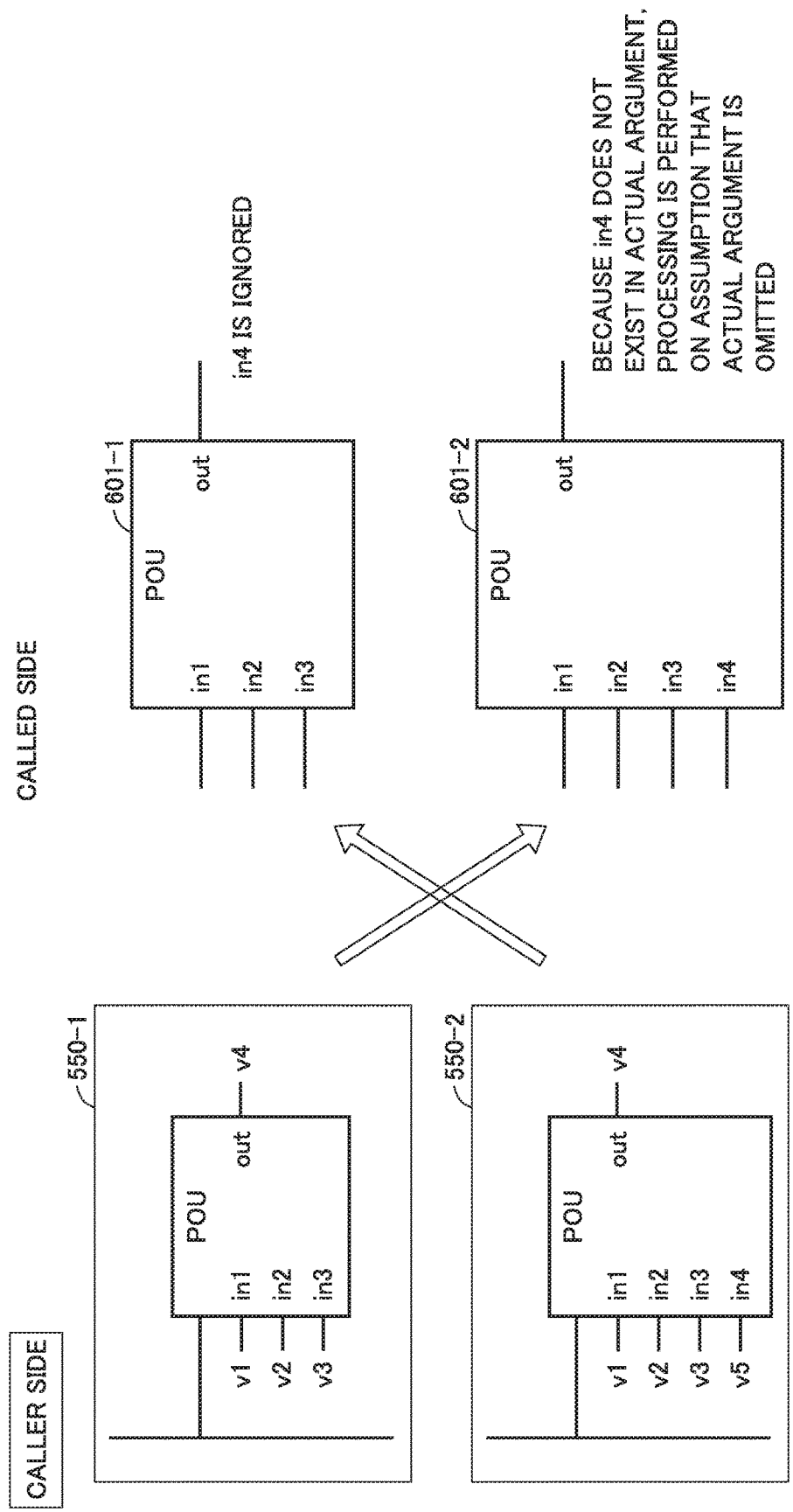

SUPPORT DEVICE AND SUPPORT PROGRAM

TECHNICAL FIELD

The present disclosure relates to a support device that supports development of a user program such as a control program to be executed by a control device that controls a control target, and a support program providing the support device.

BACKGROUND ART

A control device such as a PLC (Programmable Logic Controller) is introduced in various manufacturing sites. The control device is a kind of computer, and executes a user program such as a control program designed according to a manufacturing device or a manufacturing facility. The user program is created in a development environment prepared separately from the control device. A device that provides the development environment and provides a function of uploading the user program to the control device or downloading the user program to the control device is also referred to as a support device.

The support device provides an environment n which a user creates the user program such as the control program and a compiler (or also referred to as a builder) that converts a source code of the produced user program into a code, such as an intermediate code (or a pseudo code, an object code, and the like), which can be executed by the PLC. The support device transmits (downloads or uploads) the executable code to the PLC.

In the user program such as the control program, another program is called and used. For example, when an argument of the called program is changed, such a special countermeasure as a call-side program is changed according to the changed argument is taken.

For example, Japanese Patent Laying-Open No. 10-083312 (PTL 1) discloses a program call between different OSs (operating systems) regarding transparent conversion of a program call in an interface as a method corresponding to a scene in which the program change is required. For example, Japanese Patent Laying-Open No. 2001-331315 (PTL 2) discloses a method for performing data access from an old version with respect to a change in data structure of a data processing system.

CITATION LIST

Patent Literature

PTL 1: Japanese Patent Laying-Open No. 10-083312
PTL 2: Japanese Patent Laying-Open No. 2001-331315

SUMMARY OF INVENTION

Technical Problem

For example, the user program including the control program of the PLC includes at least one POU (Program Organization Unit) that is a unit program performing input processing, control arithmetic processing, output processing, alarm processing, and the like. Many of the POUs can be provided as a library commonly used by the user programs. When the POU is called in the user program, data is exchanged between the program on the caller side and the called POU using an I/F (interface) including an argument and the like. In order to secure compatibility of the POU between the user programs or between control devices such as the PLC, the I/F of the POU created once can hardly be changed.

For this reason, in order to secure the compatibility, it is necessary for the user to create another POU even when the I/F is changed even for the POU that performs the same processing. Additionally, it is necessary for the user to properly use the POUs in consideration of the difference of the I/F during the creation of the user program including the control program. Additionally, because the similar POUs in which only the I/Fs are different is registered in the library, management of the library becomes complicated.

One object of the present disclosure is to provide a support device and a support program for achieving the compatibility of a callable unit program configuring the user program.

Solution to Problem

According to one aspect of the present disclosure, a support device supporting development of a user program to be executed by a control device that controls a control target, the support device includes: a call detector configured to scan the user program and detect a call expression calling a callable unit program configuring the user program from the user program; and a code generator configured to generate a code having a format executable by the control device from the user program.

The code generator includes: a structure code generator configured to generate a creation instruction code creating a structure storing association information associating a name of an argument with a value set to the argument with respect to the call expression; a call code generator configured to convert the call expression into a call instruction code calling the unit program using an identifier of the structure; and a setting code generator configured to set the value of the association information to the argument when the association information corresponding to the name of the argument is stored in the structure with respect to each argument while the unit program includes at least one argument, and to generate a setting instruction code setting a predetermined value to the argument when the association information is not stored.

According to the disclosure, when the unit program called during the execution of the user program includes the arguments, the unit program can be executed with the value set to all the arguments. Thus, even when the I/F of the unit program is changed such that the number of arguments is increased or decreased, the user program can be executed without newly registering the unit program in which the I/F is changed in the library and the compatibility of the unit program is ensured.

In the disclosure, preferably the structure code generator generates the creation instruction code creating the structure each time the call detector detects the call expression of the unit program.

According to the disclosure, the call instruction code can be generated for all unit programs called in the user program by one-time scanning of the user program.

In the disclosure, preferably the structure code generator generates the creation instruction code creating the structure for each kind of the unit program called by the call expression detected by the call detector.

According to the disclosure, the structure is created for each kind of the unit program during the execution of the user program, so that an execution speed of the user program can be enhanced and the storage area where the structure is stored can be saved as compared with the case of creating the structure for each unit program.

In the disclosure, preferably the association information includes information indicating the name of the argument and information indicating the value, the information indicating the name of the argument includes an address of a storage area where the name of the argument is stored, and the information indicating the value includes an address of a storage area where the value is stored.

According to the disclosure, the association information stored in the structure can be set to the address. The address used to assign the storage area is generally a fixed length, so that the storage area where the structure is stored can be saved as compared with the case of using the argument name or the value itself having a variable data length.

In the disclosure, preferably the argument represents a variable used in the user program. The information indicating the value includes one of the address of the storage area where the value is stored and the value based on a type of a variable represented by the associated argument.

According to the disclosure, the information indicating the value of the association information can selectively be switched to the value itself or the address based on the type of the variable of the associated argument. Thus, when the association information includes not the address but the value itself, the address is directly acquired from the association information, so that the processing of reading the value from the storage area by specifying the address can be omitted.

In the disclosure, preferably the unit program includes a function determining a setting content of each argument of the unit program.

According to the disclosure, when the unit program is called during the execution of the user program, the setting content of each argument in the unit program can be determined by the executed function.

In the disclosure, preferably the call code generator converts the call expression into the call instruction code using, as the identifier of the structure, an address of an area where the structure is stored.

According to the disclosure, when the call instruction code is executed, the area of the structure can directly be assigned by the address used for the call instruction code, and the association information can be read and written.

In the disclosure, preferably the setting code generator generates an instruction code performing predetermined processing when the unit program does not include the argument.

According to the disclosure, when the unit program does not include the argument, the instruction code performing the predetermined processing can be generated as a code having an executable form.

According to one aspect of the present disclosure, a support program constructing a support device supporting development of a user program to be executed by a control device that controls a control target is provided. The support program causing a computer to function as: a call detector configured to scan the user program and detect a call expression calling a callable unit program configuring the user program from the user program; and a code generator configured to generate a code having a format executable by the control device from the user program. The code generator includes: a structure code generator configured to generate a creation instruction code creating a structure storing association information associating a name of an argument with a value set to the argument with respect to the call expression; a call code generator configured to convert the call expression into a call instruction code calling the unit program using an identifier of the structure; and a setting code generator. The setting code generator sets the value of the association information to the argument when the association information corresponding to the name of the argument is stored in the structure with respect to each argument while the unit program includes at least one argument, and generates a setting instruction code setting a predetermined value to the argument when the association information is not stored.

According to the disclosure, when the unit program called during the execution of the user program includes the arguments, the unit program can be executed with the value set to all the arguments. Thus, even when the I/F of the unit program is changed such that the number of arguments is increased or decreased, the user program can be executed without newly registering the unit program in which the I/F is changed in the library and the compatibility of the unit program is ensured.

Advantageous Effects of Invention

According to an example of the present disclosure, the compatibility of the callable unit program configuring the user program can be provided.

BRIEF DESCRIPTION OF DRAWINGS

FIG. 5 is a view schematically illustrating an example of a user program according to the embodiment of the present invention.

FIG. 6 is a view schematically illustrating an example of a conventional intermediate code on a caller side of a POU.

FIG. 7 is a diagram schematically illustrating an example of a conventional intermediate code of a called side (POU).

FIG. 8 is a view schematically illustrating an example of the intermediate code generated according to an "associative array for each call" method of the embodiment of the present invention.

FIG. 9 is a view schematically illustrating an example of the intermediate code generated according to the "associative array for each call" method of the embodiment of the present invention.

FIG. 17 is a view schematically illustrating an example of an associative array generated according to the "associative array for each kind" method of the embodiment of the present invention.

FIG. 18 is a view schematically illustrating an example of the intermediate code generated according to the "associative array for each kind" method of the embodiment of the present invention.

FIG. 19 is a view schematically illustrating an example of a format and a content of a call of a built-in function according to the embodiment of the present invention.

FIG. 20 is a view schematically illustrating an example of advantages obtained by the present embodiment.

DESCRIPTION OF EMBODIMENT

Figure 1:
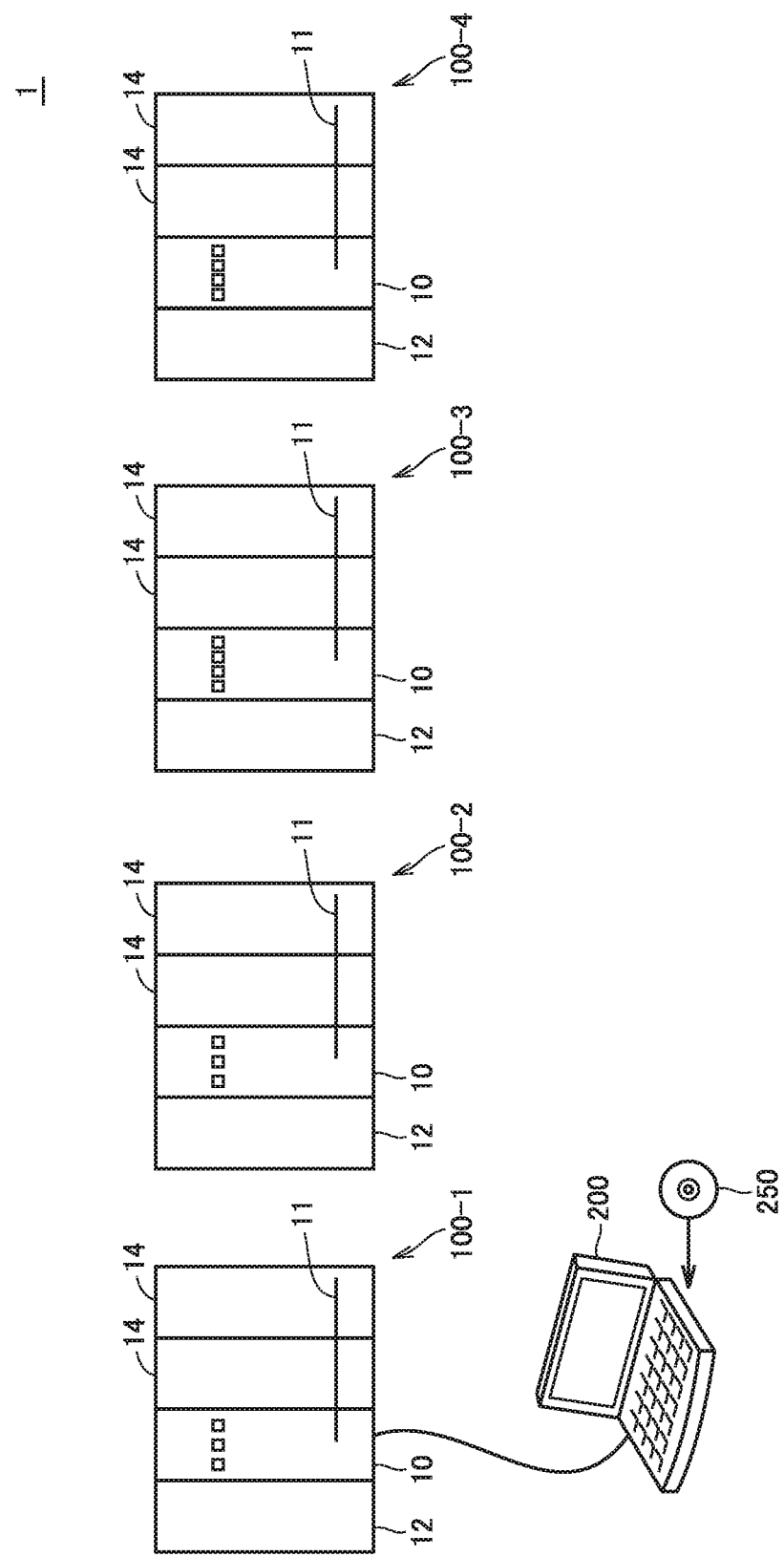
FIG. 1 is a schematic diagram illustrating a configuration example of a PLC system to which a support device according to an embodiment can be applied.

An embodiment of the present invention will be described in detail with reference to the drawings. The same or equivalent portion in the drawings is denoted by the same reference numeral, and the description will not be repeated.

<A. Application Example>

Figure 4:
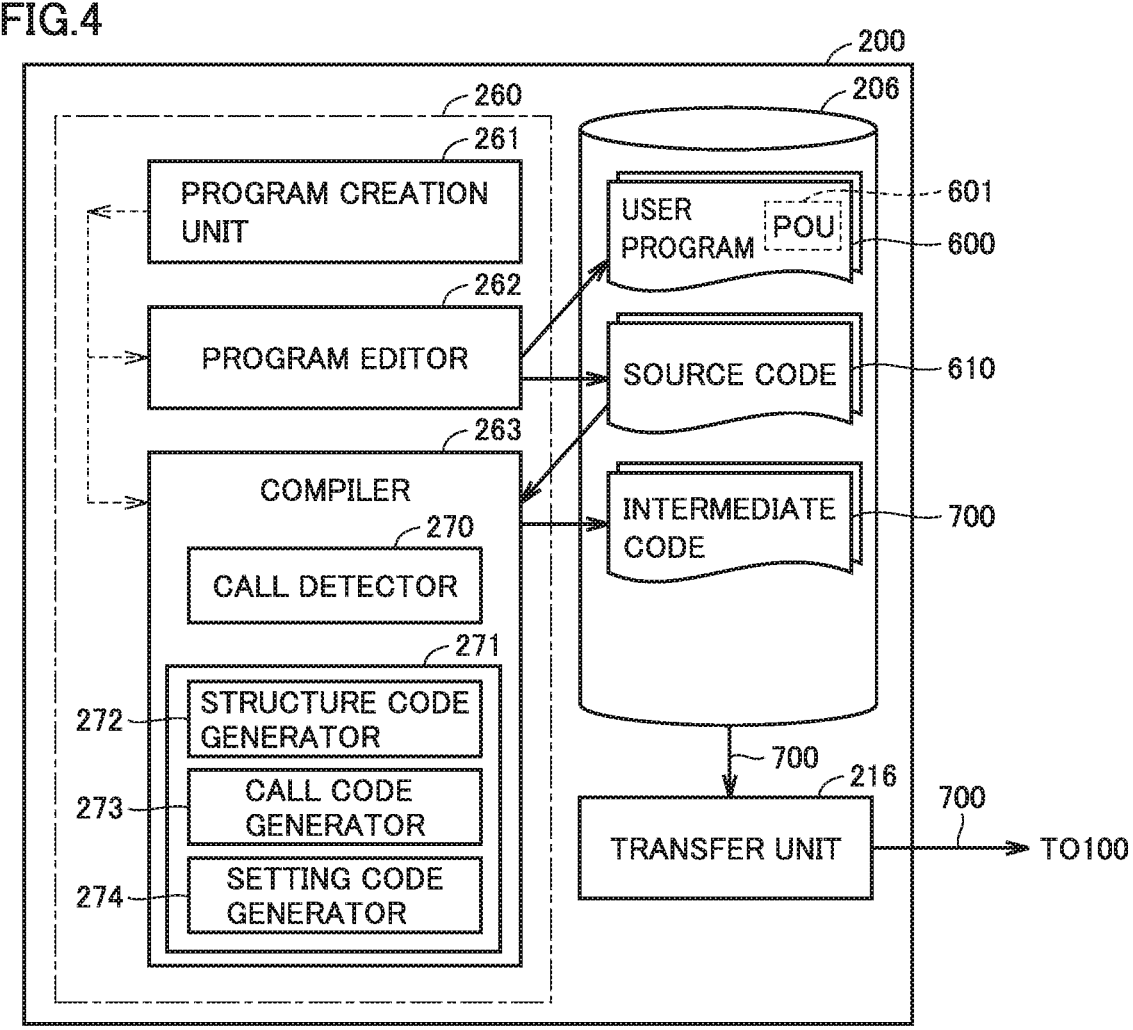
FIG. 4 is a schematic diagram illustrating an example of an application scene of the support device of the embodiment.

With reference to FIG. 4, an example of a scene to which the present invention is applied will be described. FIG. 4 is a schematic diagram illustrating an example of an application scene of a support device 200 according to an embodiment. Support device 200 that supports development of a user program 600 to be executed by a control device that controls a control target is provided in the embodiment. For example, user program 600 can include a control program controlling the control target. For example, the control device can include a PLC 100.

Support device 200 includes a program development unit 260 as a development support environment for user program 600. Support device 200 uses a storage unit such as a RAM (Random Access Memory) 206 as an area where data related to compilation is stored and a work area. The storage unit is not limited to RAM 206, but may include an HDD (Hard Disk Drive) and the like.

A compiler 263 included in program development unit 260 compiles user program 600 while accessing the storage unit such as RAM 206. Compiler 263 includes a code generator 271 and a call detector 270. The code generator 271 generates an intermediate code 700 as a code having a format executable by the control device from user program 600. The call detector 270 detects a call expression calling a callable unit program (POU 601) configuring user program 600 while scanning user program 600. For example, the call expression includes a name (identifier) of the unit program and an argument name of at least one argument. For example, when the unit program is a function, the call expression is represented by a function name (the name of argument 1, the name of argument 2, . . . ). As illustrated in a modification described later, the number of arguments of the unit program may be zero. However, for convenience, the number of arguments of the unit program is at least one.

Code generator 271 includes a structure code generator 272, a call code generator 273, and a setting code generator 274. The structure code generator 272 generates a creation instruction code creating a structure that stores association information associating the argument name with a value set in the argument with respect to each of at least one argument of the unit program included in the detected call expression. For example, the structure has an array type structure, and more specifically has an associative array type structure.

Call code generator 273 converts the call expression into a call instruction code calling the unit program in which at least one argument name of the unit program is changed to the identifier of the structure.

Setting code generator 274 generates a setting instruction code when a code having an executable format of the unit program is generated. The setting instruction code includes an instruction code in which, for each of at least one argument of the unit program, the value associated by the association information is set to the argument when the association information corresponding to the argument name of the argument is stored in the structure, and a predetermined value is set to the argument when the association information is not stored. Consequently, the intermediate code of the unit program includes the instruction code indicating an original processing content and the setting instruction code generated by setting code generator 274.

When the setting instruction code is executed, the predetermined value set to the argument is a value that enables the execution of the unit program by treating the value of the argument as the omission, and the predetermined value can include a default value, a value indicating an error, and the like.

A transfer unit 216 included in support device 200 reads intermediate code 700 from the storage unit such as RAM 206 according to a user's operation content received through an input device, and transmits (downloads or uploads) read intermediate code 700 to the control device. Transfer unit 216 transmits intermediate code 700 to the control device through wired or wireless connection, or a recording medium such as a memory card.

When the control device executes the code having the executable format (hereinafter, referred to as an executable format code) from support device 200, the unit program is called from a library of the control device by the call instruction code. A value associated by the association information about the structure or a predetermined value is set to each argument of the unit program called from the library using the setting instruction code. As described above, the unit program called during the execution of user program 600 by the control device is executed, with some values set to all arguments of the unit program.

Consequently, when the is changed by changing the number of arguments, or the like, the unit program called during the execution of user program 600 can be executed to ensure the compatibility of the unit program without registering the changed unit program in the library as a "function expansion version". This also facilitates management of unit programs in the library, which results in maintainability of the library.

For example, user program 600 can include one or a combination of a plurality of sequence programs described in a ladder logic language. The program is not limited to the sequence program, but may be a motion program. The programming language is not also limited to the ladder logic language.

For example, the unit program includes a POU (Program Organization Unit) 601 that can be called in the user program 600. POU 601 can include a kind of subroutine or function. The subroutine or function is called from another program (including another POU 601) and executed, and returns an execution result to the program of a caller side. Support device 200 can also receive a user operation to create POU 601, generate an executable format code for each created POU 601, and send the executable code to the control device (PLC 100).

POU 601 includes an I/F (interface) that calls POU 601. The I/F includes at least one argument (variable) delivering a value such as a global variable and a local variable between programs including POU 601.

Although intermediate code 700 is illustrated as the executable code, a pseudo code may be used. The control device (PLC 100) can also convert intermediate code 700 received from support device 200 into the code suitable for the specifications of the control device, and execute the converted code. In this sense, in this application example, intermediate code 700 is used as being located between source code 610 of user program 600 and the code suitable for the specifications of the control device.

In the following description, the argument has two kinds, namely, a dummy argument and an actual argument. For example, when POU 601 (unit program) is a function, the dummy argument corresponds to a variable (parameter) in defining the function of POU 601. For example, when POU 601 is a function, the actual argument corresponds to a value delivered to the function of POU 601 during the execution of POU 601 (the execution of an operation according to the function). As described above, during the execution of POU 601, the value of the actual argument is substituted for the dummy argument, and the program is executed using the value of the substituted actual argument (for example, the operation of the function). In the present disclosure, an address can include both a physical address and a logical address.

Hereinafter, a more detailed configuration and processing of support device 200 of the embodiment will be described as a more specific application example of the present invention.

<B. Configuration Example of PLC System>

A configuration example of a PLC system 1 to which support device 200 of the embodiment can be applied will be described. FIG. 1 is a schematic diagram illustrating a configuration example of PLC system 1 to which support device 200 of the embodiment can be applied.

With reference to FIG. 1, PLC system 1 includes a plurality of PLCs 100-1, 100-2, 100-3, 100-4, . . . (hereinafter, also collectively referred to as a "PLC 100"). It is assumed that each of PLCs 100 is provided in a control system that controls a similar manufacturing device, and that the control programs executed in each of the PLCs 100 are substantially the same. Support device 200 of the embodiment develops a control program controlling the operation of each PLC 100, and downloads (or uploads) the developed control program to each PLC. The number of PLCs provided in PLC system 1 is not limited to the plural number, but may be one or more.

Each of PLCs 100 is an example of the control device that controls the control target. PLC 100 typically includes a CPU unit 10 as a main body that executes various programs including the control program, a power supply unit 12 that supplies power to CPU unit 10 and the like, and an I/O (Input/Output) unit 14 that exchanges a signal from a field. I/O unit 14 is connected to CPU unit 10 through a system bus 11.

Support device 200 supports the development of the control program to be executed by PLC 100 as the control device that controls the control target. Support device 200 has a function of providing the environment for the development of user program 600 including the control program to be executed by PLC 100, a function of setting the control program and various pieces of information to PLC 100, a function of acquiring a status value of operating PLC 100, and the like. Support device 200 may have a debug function or a simulation function in order to assist the user in developing user program 600 including the control program.

Various functions described above are implemented by installing the support program, which is an application program stored in a recording medium 250, in the support device 200. Instead of recording medium 250, the support program may be downloaded from an external server device or the like through a network. For example, support device 200 is connected to CPU unit 10 of PLC 100 through a connection cable. Support device 200 is typically constructed by a personal computer.

<C. Hardware Configuration of PLC 100>

Figure 2:
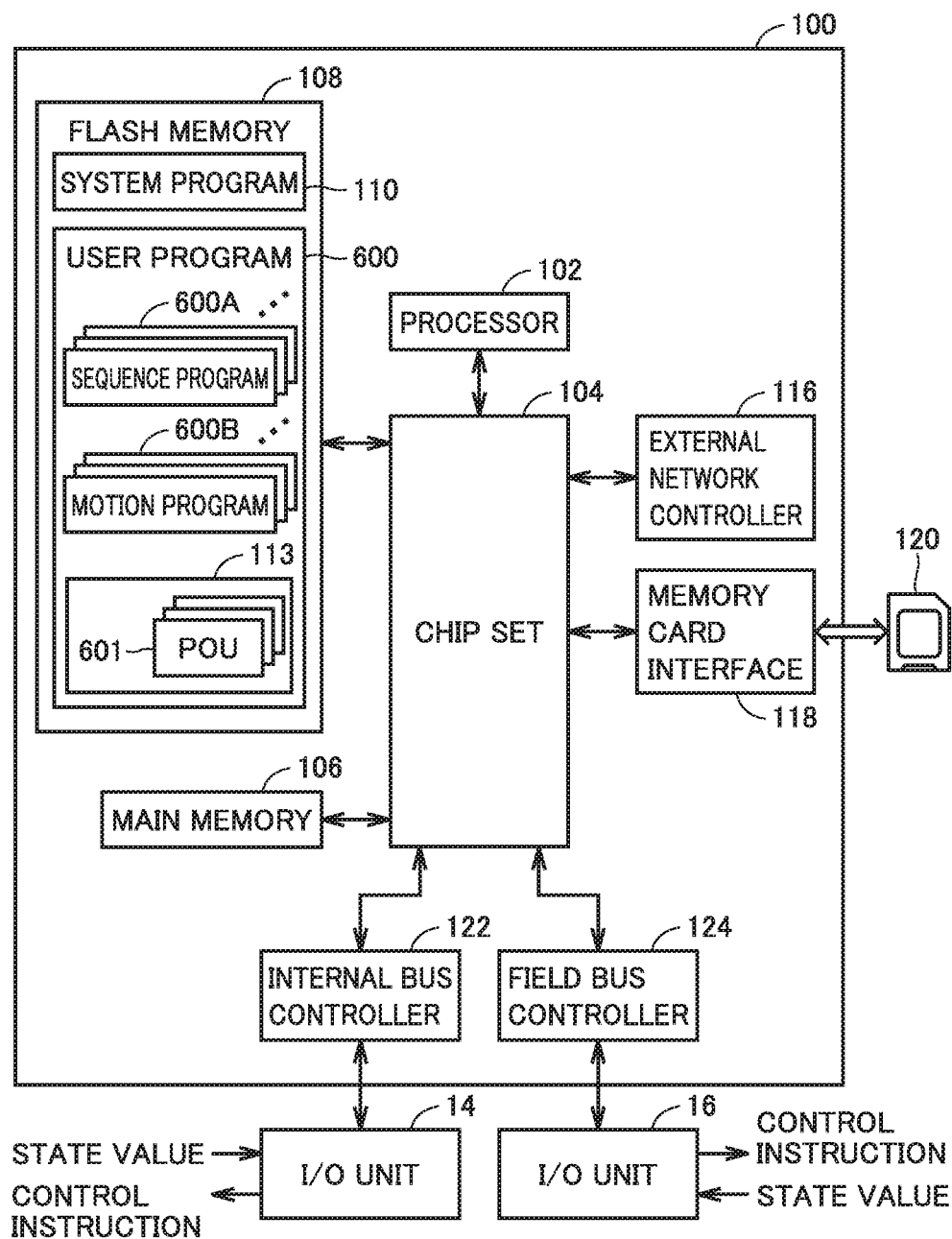
FIG. 2 is a schematic diagram illustrating a hardware configuration example of a PLC configuring the PLC system in FIG. 1.

A hardware configuration example of PLC 100 will be described below. FIG. 2 is a schematic diagram illustrating the hardware configuration example of PLC 100 included in the PLC system in FIG. 1.

With reference to FIG. 2, PLC 100 implements the control of the control target by causing a processor to execute a previously installed program. More specifically, PLC 100 includes a processor 102 such as a CPU (Central Processing Unit) or an MPU (Micro-Processing Unit), a chip set 104, a main memory 106, a flash memory 108, an external network controller 116, a memory card interface 118, an internal bus controller 122, and a field bus controller 124.

Processor 102 reads system program 110 and user program 600 stored in flash memory 108, and expands system program 110 and user program 600 in main memory 106, thereby implementing the control of the control target. User program 600 includes one or a plurality of POUs 601 that are registered in library 113. Each POU 601 of library 113 is registered in the form of an executable form code (for example, the intermediate code).

System program 110 includes the instruction code providing such a basic function of PLC 100 as data input/output processing and execution timing control. User program 600 includes a kind of control program arbitrarily designed according to the control target. The control programs include a sequence program 600A executing sequence control and a motion program 600B executing motion control. User program 600 of PLC 100 can include user program 600 indicated by intermediate code 700 from support device 200.

Chip set 104 performs processing of entire PLC 100 by controlling each component.

Internal bus controller 122 is an interface that exchanges the data between PLC 100 and I/O unit 14 connected to PLC 100 through an internal bus. Field bus controller 124 is an interface that exchanges the data between PLC 100 and an I/O unit 16 connected to PLC 100 through a field bus (not illustrated). Internal bus controller 122 and fieldbus controller 124 acquire the status values input to corresponding I/O units 14 and 16, respectively, and output the operation result of the processor 102 as a command value from corresponding I/O units 14 and 16.

External network controller 116 controls the data exchange through various wired and wireless networks. Memory card interface 118 is configured such that memory card 120 is detachable, and can write and read the data in and from memory card 120.

Some or all of the functions provided by executing program using PLC 100 may be implemented as a dedicated hardware circuit.

<D. Hardware Configuration Example of Support Device 200>

Figure 3:
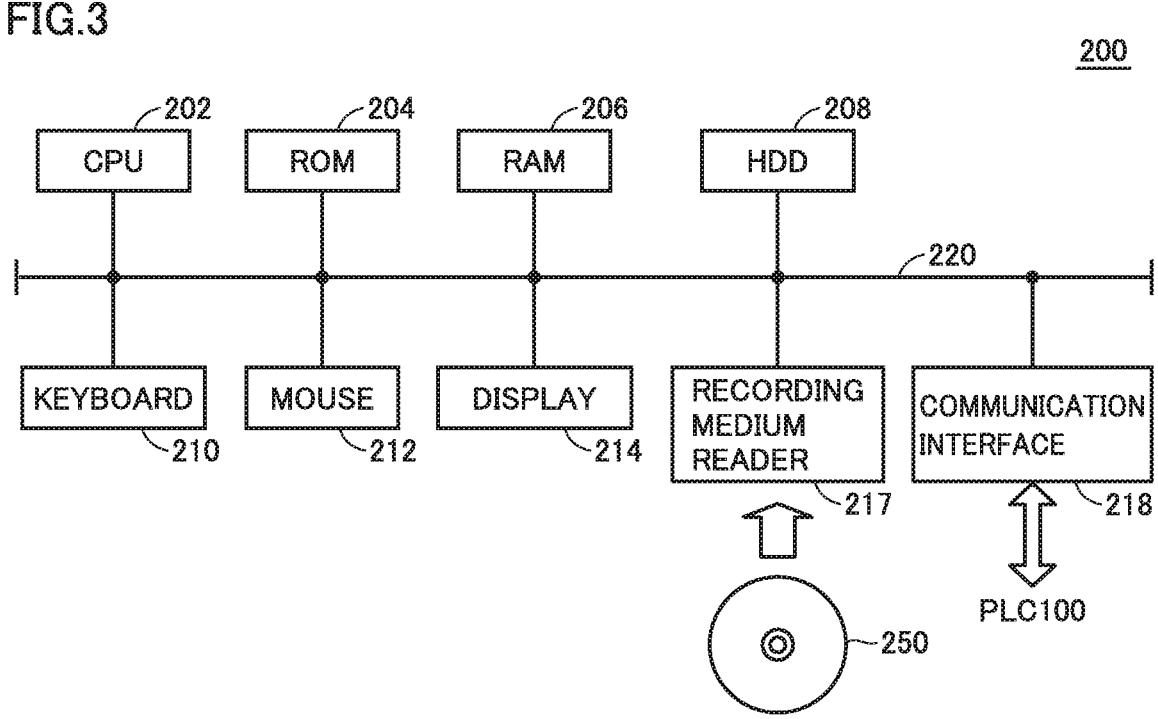
FIG. 3 is a schematic diagram illustrating a hardware configuration example of a support device configuring the PLC system in FIG. 1.

A hardware configuration example of support device 200 will be described below. FIG. 3 is a schematic diagram illustrating the hardware configuration example of support device 200 included in the PLC system in FIG. 1. With reference to FIG. 3, support device 200 is typically constructed with a general-purpose computer. In the manufacturing site where PLC 100 is disposed, support device 200 may be provided in the form of a notebook type personal computer having excellent portability.

Support device 200 includes a CPU 202 that executes various programs including an operating system (OS), a ROM (Read Only Memory) 204 that stores a BIOS (Basic Input Output System) and various data, RAM 206 that provides the work area storing the data necessary for the execution of the program in CPU 202, and a hard disk (HDD) 208 that stores programs executed by CPU 202 in a nonvolatile manner.

Support device 200 further includes a keyboard 210 and a mouse 212 that receive an operation from a user and a display 214 that presents information to the user. Support device 200 includes a communication interface 218 that communicates with PLC 100 (CPU unit 10) and the like.

Support device 200 includes a recording medium reader 217 that reads a support program stored in recording medium 250. The support program can include a program constructing program development unit 260 having the compiler 263.

<E. Program Development Environment>

With reference to FIG. 4 again, a program development environment provided by support device 200 will be described.

The user can change, update, and delete the programs in units of POU 601 using the editing function provided by a program editor 262 of the program development unit 260 in FIG. 4. According to a user operation content received through an input device such as keyboard 210, program editor 262 edits user program 600, and converts edited user program 600 into a source code 610 of a predetermined program description language.

Variable programming can be performed on the control program to be executed by PLC 100, and various pieces of processing can be executed using variable values associated with the field data defined in a global variable or a local variable table in PLC 100. The value set to the argument of the above POU can include these variable values. Thus, the I/F of related POU 601 can be changed when the global variable or the local variable is changed due to a change in a field device (a device of the control target) or the like. For example, the number of arguments of the I/F can be changed.

Sometimes the function of compiler 263 for scanning user program 600 to generate intermediate code 700 is provided as a part of a builder included in the support device 200. For example, the builder has both compiling and linking functions, thereby creating an executable file by linking a plurality of files of intermediate code 700 generated by compiling. Thus, compiler 263 can be provided as a part of the builder included in support device 200. In this case, intermediate code 700 can be transferred to the control device (PLC 100) as the executable file.

<F. User Program and Conventional Intermediate Code>

FIG. 5 is a view schematically illustrating an example of user program 600 according to the embodiment of the present invention. FIG. 6 is a view schematically illustrating an example of the conventional intermediate code on a caller side of the POU. FIG. 7 is a view schematically illustrating an example of the conventional intermediate code on a called side (POU). With reference to FIG. 5, user program 600 is described in a range from START indicating start of the program to END indicating end of the program. User program 600 includes a declaration unit 400 such as the name (identifier) of POU 601 called in the program and the name and data type of each argument, and a PROGRAM unit 500 describing a program bar on the caller side of POU 601. Hereinafter, it is assumed that POU 601 is a function in which the name is "foo".

With reference to FIG. 5, in PROGRAM unit 500, a call of POU 601 is described by a call expression 550. Call expression 550 (foo (in1:=a+b, inout2:=c [idx], out3→d)) has a POU name of "foo" and three arguments, the argument names are in1, inout3, and out3, and POU 601 is called by assigning a+b, c[idx], and d to the values of the arguments.

When user program 600 in FIG. 5 is compiled by a conventional method, for example, the intermediate code in FIG. 6 is generated for the program bar on the caller side. With reference to FIG. 6, intermediate code 501 corresponding to the program bar includes a POU call code 502 corresponding to call expression 550 of POU 601, a code 503 of another portion, and a code 504 setting a return value d. Code 503 includes an instruction code calculating (acquiring) the value of each argument of POU 601. Consequently, when POU 601 is called from the program bar during the execution of user program 600, the actual argument that is the value calculated (acquired) by the program bar is delivered to each argument (dummy argument) of the POU.

With reference to FIG. 7, intermediate code 540 of POU 601 on the called side includes an instruction code 542 acquiring the value (the value of the actual argument) delivered to each argument, an instruction code 543 executing processing (such as an arithmetic processing) using the value of each delivered argument, and a code 544 setting a processing result as the return value.

<G. Method for Generating Creation Instruction Code of Associative Array>

Code generator 271 of the embodiment generates a creation instruction code instructing creation of an associative array that is an example of a structure in association with POU 601. In the embodiment, the creation instruction code is provided by two methods, namely, an "associative array for each call" and an "associative array for each kind".

In the "associative array for each call", each time call detector 270 detects call expression 550 of the POU during the scanning of user program 600, the structure code generator 272 generates the creation instruction code creating the associative array. On the other hand, in the "associative array for each kind", the creation instruction code creating the associative array for each kind of POU 601 called by call expression 550 detected by call detector 270 during the scanning of user program 600.

Compiler 263 has both functions (modules) of the "associative array for each call" and the "associative array for each kind". Compiler 263 activates one of the functions (modules) based on the instruction received from the user through the input device.

<H. "Associative Array for Each Call" Method>

The "associative array for each call" method will be described.

(H-1. Intermediate Code of Associative Array for Each Call)

FIGS. 8 and 9 are views schematically illustrating an example of the intermediate code generated according to the "associative array for each call" method of the embodiment of the present invention. Intermediate code in FIG. 8 illustrates an example of intermediate code 510 generated from the program bar in FIG. 5, which is the caller side of the POU (foo), according to the "associative array for each call" method.

Intermediate code 510 includes code 503 of another portion similar to FIG. 6 and code 520 generated in association with the call of POU 601. Code 520 includes a call instruction code 522 for POU 601, a creation instruction code 521 for the associative array, and a release instruction code 523 instructing release of an area of the associative array.

Because code 503 is the same as that in FIG. 6, the description thereof will not be repeated. Creation instruction code 521 includes an instruction code instructing the creation of the associative array storing the association information associating the argument name with the value (actual argument) set to the argument with respect to each of at least one argument included in call expression 550. Specifically, creation instruction code 521 includes an instruction code 5211 assuring the storage area of the associative array having a size based on the number of arguments (in1, inout2, out3) in association with the POU identifier (name foo) of call expression 550, an instruction code 5210 acquiring the address of the storage area where the value (actual argument) of each argument calculated (acquired) by the program bar that is the caller side of POU 601 is stored, and an instruction code 5212 setting the address (that is, the address acquired by instruction code 5210) of the area where the value is stored to the associative array (storage area) in association with each argument name with respect to each argument of POU 601.

Instruction code 5211 represents an instruction code specifying the associative array identifier ("tmp7") to assure the area where the data (for example, NULL) indicating an area corresponding to the total number of arguments (in the case of foo, three arguments) and a termination (terminator) of the associative array is stored. At this point, for example, a head address (for example, "tmp7") of the area where the associative array is stored is assigned to the identifier of the associative array.

Call instruction code 522 represents an instruction code calling POU 601 in which at least one argument name is changed to the associative array identifier ("tmp7") using call expression 550.

Release instruction code 523 represents a code instructing the release of the storage area used for the associative array when the processing of POU 601 is completed to return from POU 601 to the program bar that is the caller side. In the embodiment, the term "the release of the storage area" includes a change of the storage area from a used state to an unused state, namely, a free area.

In the "associative array for each call" method, each time user program 600 is scanned to detect call expression 550, creation instruction code 521 creating the associative array is generated.

Intermediate code 530 in FIG. 9 illustrates an example of the intermediate code of POU 601 to be called. With reference to FIG. 9, intermediate code 530 includes a setting instruction code 532 in addition to intermediate code 543 and intermediate code 544 in FIG. 7. In FIG. 9, setting instruction code 532 includes an instruction code instructing the acquisition (read) of the address at which the value (actual argument) corresponding to each argument name is stored from the associative array, and the setting of the value read from the area of the acquired address to the corresponding argument. When the value read from the address area is NULL, setting instruction code 532 includes an instruction code instructing the setting of a default value to the argument of the argument name.

Thus, when POU 601 is called during the execution of user program 600 in PLC 100, the value (actual argument) acquired (calculated) by the program bar on the caller side or (when the value is not acquired) a predetermined value (for example, a default value) is set to each argument through the associative array before instruction code 543 of the original processing of POU 601 is executed. Consequently, when the processing of subsequent instruction code 543 is executed, an error caused by an indefinite value of the argument is prevented.

(H-2. Flowchart of Associative Array for Each Call (Caller Side))

Figure 10:
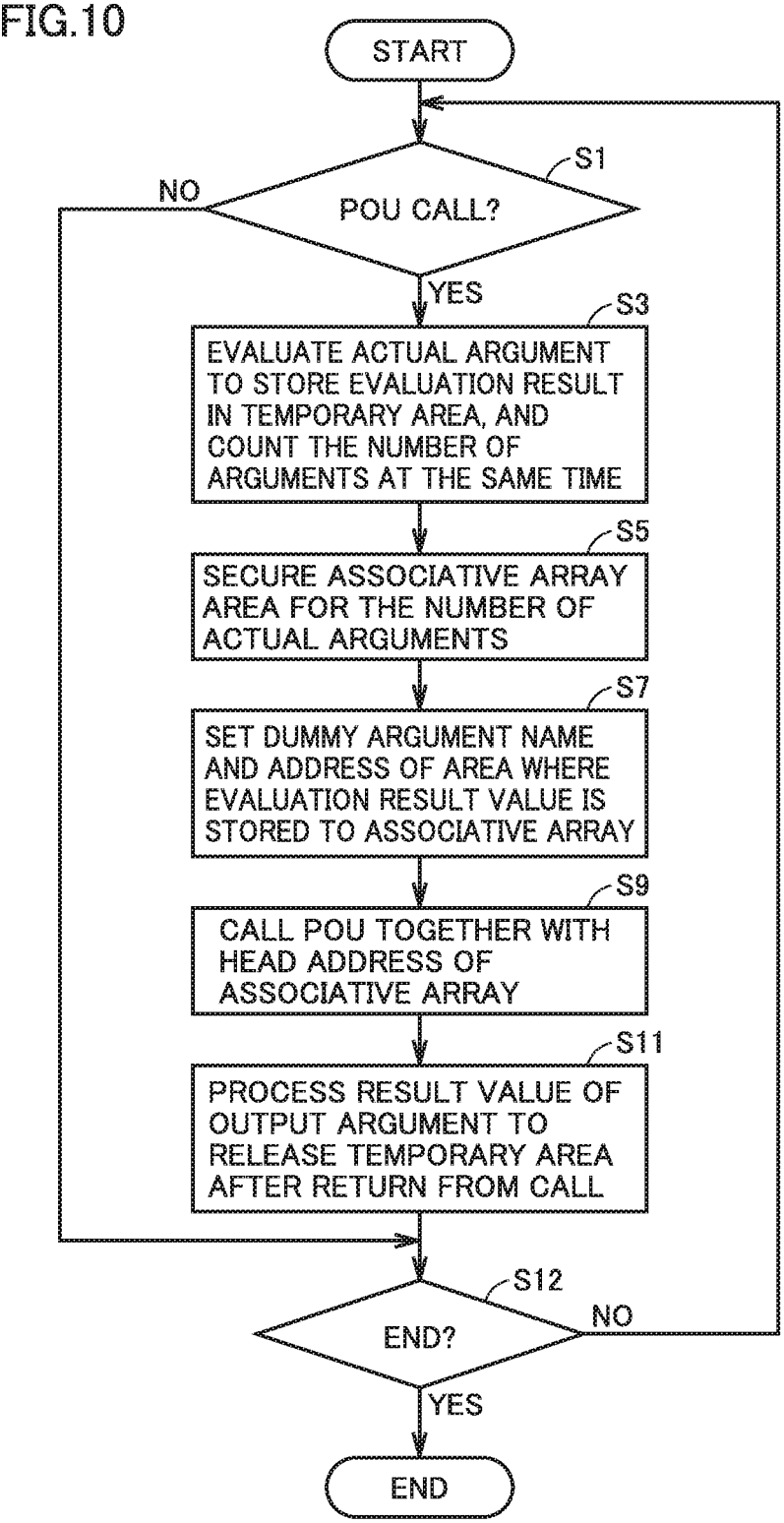
FIG. 10 is a flowchart illustrating an example of caller-side intermediate code generation processing according to the "associative array for each call" method of the embodiment of the present invention.
Figure 11:
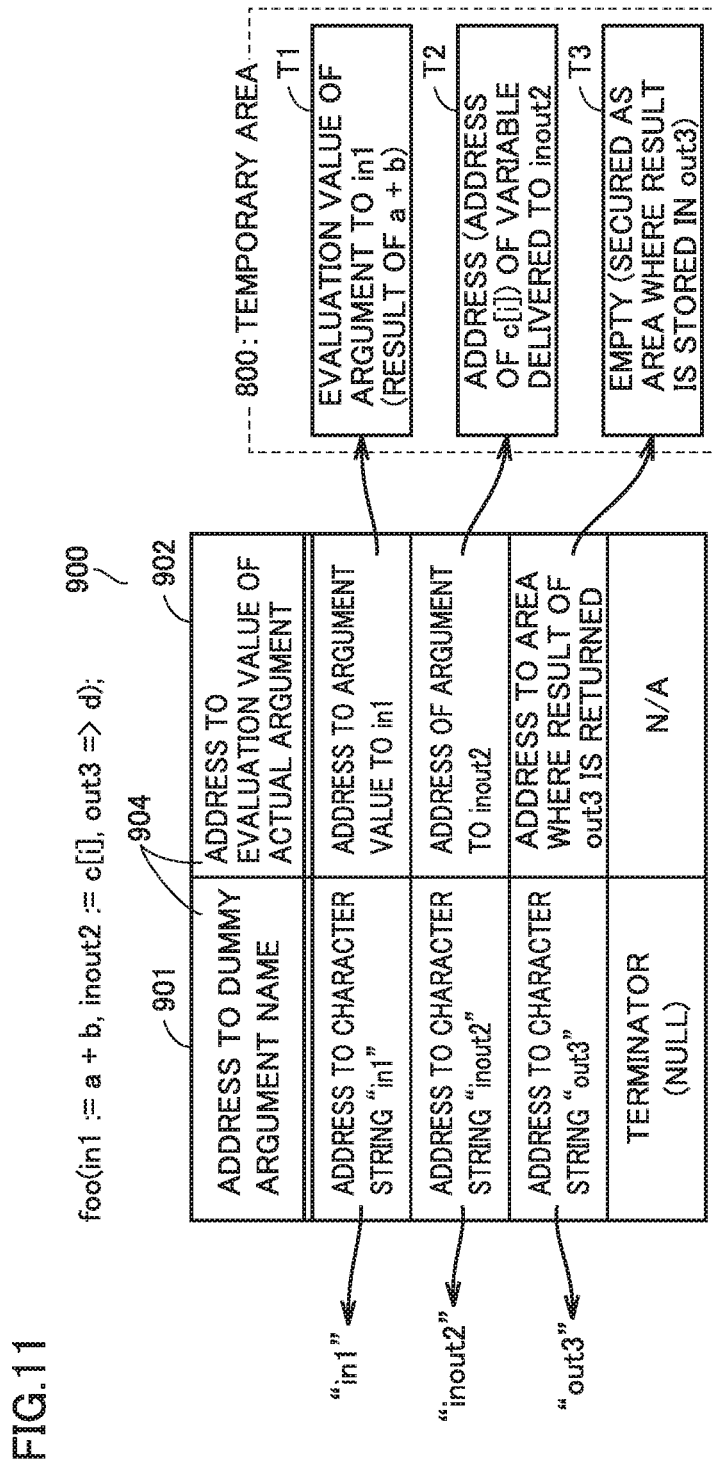
FIG. 11 is a view schematically illustrating an example of contents of a temporary area and an associative array used in the processing of FIG. 10.

FIG. 10 is a flowchart illustrating an example of caller-side intermediate code generation processing according to the "associative array for each call" method of the embodiment of the present invention. FIG. 11 is a view schematically illustrating an example of contents of a temporary area 800 and an associative array 900 used in the processing of FIG. 10. With reference to FIG. 10, the processing of generating the intermediate code of the program bar that is an example of user program 600 on the caller side of POU 601 will be described. For example, temporary area 800 and associative array 900 are a storage area of PLC 100, and typically correspond to a volatile storage area such as a RAM.

Call detector 270 determines whether to detect call expression 550 while scanning user program 600 (source code 610) (step S1). When it is determined that that call expression 550 is detected (YES in step S1), the processing proceeds to steps from step S3. When it is determined that call expression 550 is not detected (NO in step S1), call detector 270 determines whether the scanning is performed up to the termination of user program 600 (step S12). When it is determined that the scanning is completed up to the termination of user program 600 (YES in step S12), call detector 270 ends the processing. When it is determined that the scanning is not completed up to the termination of user program 600 (NO in step S12), the processing returns to step S1 to continue the scanning of user program 600.

When call detector 270 detects call expression 550 (YES in step S1), code generator 271 evaluates the actual argument of POU 601 and generates code 503 instructing the storage of the evaluation result in temporary area 800 (step S3). Code generator 271 generates an instruction code counting the number of arguments included in detected call expression 550 (step S3).

Specifically, with reference to FIG. 11, code 503 generated in step S3 includes the instruction code instructing the storage of the value delivered to the variable of each dummy argument, namely, the evaluation value of the variable of the actual argument in temporary area 800 in FIG. 11. Specifically, code 503 includes the instruction code instructing the storage of the addresses of an area. T1 (that is, the operation result (a+b) value of the program bar on the caller side of POU 601) where the evaluation value of the actual argument to input variable in1 that is the first dummy argument is stored, an area T2 (that is, the address (the address of c[i]) of the variable to delivered to inout2) where the evaluation value of the actual argument to the input and output variable inout2, that is the second dummy argument is stored, and an area T3 (that is, empty (secured as an area where the value of the processing result of the POU is stored in out3) where the evaluation value of the actual argument is stored in the output variable out3 that is the third dummy argument. For example, temporary area 800 is a kind of stack area, and is set so as not to overlap the storage area where values of other variables and the like are stored.

The evaluation values stored in corresponding area T1 to T3 differ from each other for each kind of the variable represented by the argument. In the embodiment, for example, the kinds of the variables represented by the arguments that can be included in the I/F of POU 601 include three kinds of the input variable, the input and output variable, and the output variable. The kinds of evaluation values stored in areas T1 to T3 vary according to the kinds of the variables.

Subsequently, structure code generator 272 generates instruction code 5211 instructing the security of the area of associative array 900 having the number of entries based on the total number of dummy arguments counted in step S3 (step S5). In step S5, the number of entries of associative array 900 is set to a number obtained by adding one representing the termination to the total number of dummy arguments such that the termination of the associative array can easily be determined in, for example, step S13 (to be described below).

Structure code generator 272 generates instruction codes 5210 and 5212 (step S7). Instruction codes 5210 and 5212 are an instruction code storing association information 904 associating the argument name and the value (actual argument) set to the argument with each other in each entry (an entry for each of at least one argument included in the call expression) of associative array 900.

Association information 904 about each entry of associative array 900 includes information indicating the argument name and information indicating the value (actual argument). More specifically, the information indicating the argument name includes an address 901 of the storage area where the argument name is stored. The information indicating the value includes an address 902 of the storage area where the value is stored.

Call code generator 273 generates call instruction code 522 calling POU 601 in which at least one argument name is changed to the identifier of associative array 900 with respect to call expression 550 (step S9). At this point, in call instruction code 522, information (such as "tmp7") indicating the head address of the storage area of associative array 900 is used as the identifier of associative array 900.

Code generator 271 generates code 504 of the processing of reading, from area T3 of temporary area 800 through the associative array, the value (that is, the value stored in area T3) delivered to the dummy argument (output variable out3) in returning to the processing of the original program bar from POU 601, and release instruction code 523 releasing temporary area 800 (that is, releasing the area of the associative array) (step S11). Thereafter, the processing transfers to step S12.

As described above, compiler 263 generates the intermediate code including codes 503, 5210 to 5212 creating the associative array having entries corresponding to the number of dummy arguments of the POU and call instruction code 522 calling the POU from the library using the associative array for each POU called in user program 600 on the caller side of POU 601.

Not the argument name or the value (actual argument), but the address of the area where the argument name or the value (actual argument) is stored during execution of the program is set as association information 904 to each entry of associative array 900 generated by the execution of instruction codes 5210, 5212. As the background of the present invention, because an address length accessing the storage area is generally fixed, as compared with the case of storing the argument name or the value (actual argument) in which a data length may vary, the storage of the address of the area can save the storage area required for associative array 900.

In the call instruction code 522, because the head address of the storage area of associative array 900 is used as the identifier of associative array 900, a direct addressing by using the head address can be realized, and a search (reading and writing) of associative array 900 is facilitated as compared with a method for attaching a unique name to associative array 900.

(H-3. Flowchart of Associative Array for Each Call (Called Side))

Figure 12:
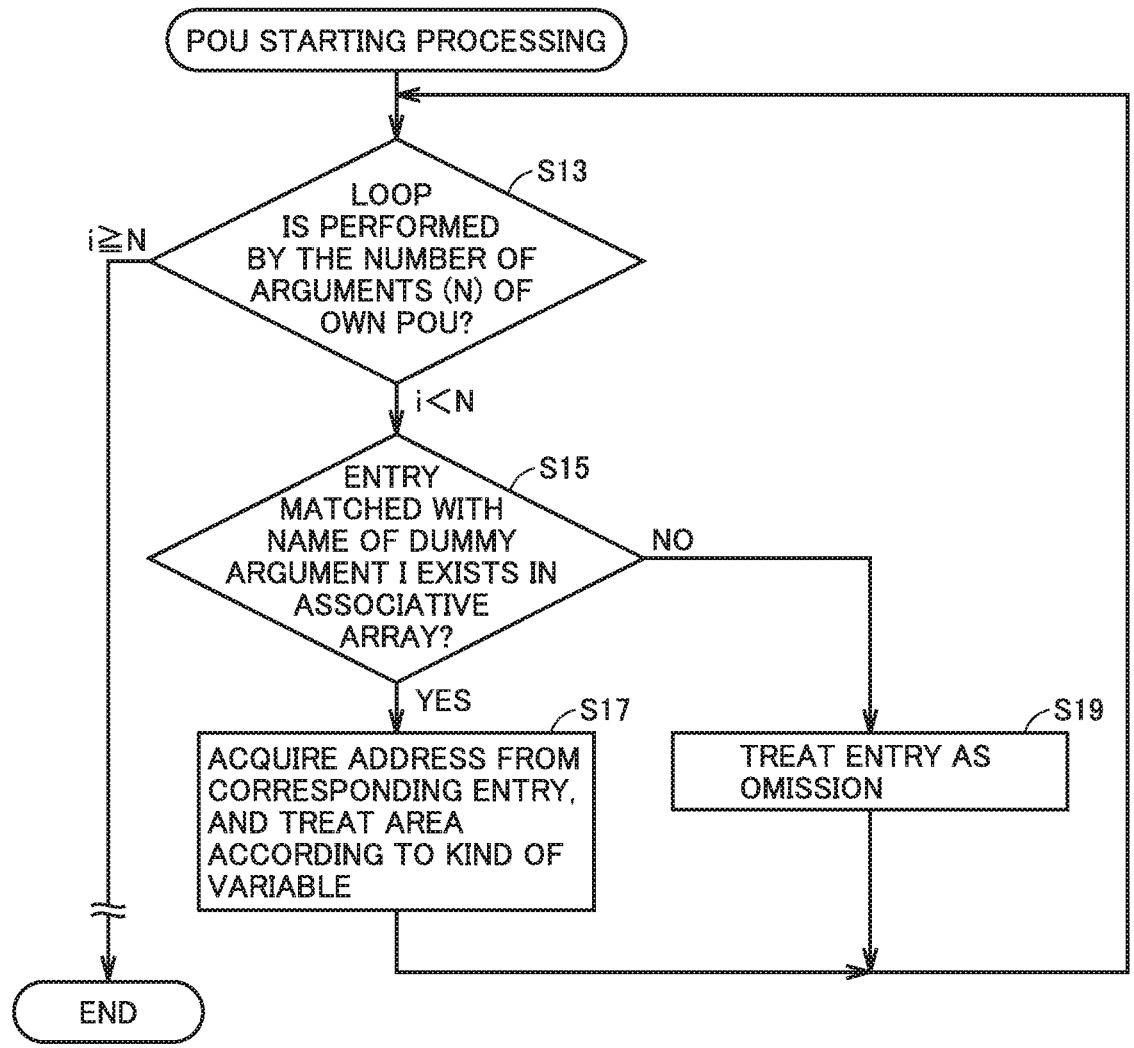
FIG. 12 is a flowchart illustrating an example of called-side intermediate code generation processing according to the "associative array for each call" method of the embodiment of the present invention.

FIG. 12 is a flowchart illustrating an example of called-side intermediate code generation processing according to the "associative array for each call" method of the embodiment of the present invention. With reference to FIG. 12, the processing of generating the intermediate code associated with POU 601 called from library 113 by the program bar or the like will be described.

Setting code generator 274 generates setting instruction code 532 in the pieces of processing in steps S13 to S19 when compiler 263 compiles the POU. Setting instruction code 532 is an instruction code that is executed before the execution of instruction code 543 indicating the processing of POU 601, and is executed, for example, immediately after the start of the processing of the POU.

Specifically, setting code generator 274 generates setting instruction code 532 in which, for each of at least one argument of POU 601, the value (actual argument) of the association information is set to the argument when association information 904 corresponding to the argument name of the argument is stored in associative array 900, and a predetermined value is set to the argument when association information 904 is not stored.

Setting instruction code 532 includes an instruction code searching associative array 900 by the number (for example, N) of dummy arguments of the POU using the dummy argument name (variable name) as a key (step S15, (i<N) holds in step S13) and setting the value read from the area assigned by address 902 of the specified entry to the variable of the dummy argument (step S17) when the entry matched with the argument name stored in the area of address 901 in the entries can be specified (YES in step S15). Setting instruction code 532 includes an instruction code instructing omission of the variable value of the dummy argument (step S19) when a determination that the value read from the area of address 902 is NULL is made (NO in step S15). For example, an instruction code setting a default value to the variable of the dummy argument or an instruction code outputting an error can be generated in step S19. When a series of processing is performed by the number (for example, N) of dummy arguments of the POU (that is, when (i≥N) is satisfied in step S13), the processing in FIG. 12 ends.

Setting instruction code 532 generated in step S17 includes an instruction code changing the value set to the dummy argument according to the kind of the variable corresponding to the dummy argument. For example, setting instruction code 532 includes an instruction code acquiring the value from the area of address 902 when the kind of the variable is the input variable, an instruction code acquiring the address of the area where the value of the variable is stored when the kind of the variable is the input and output variable, or an instruction code acquiring the address of the area where the output (return value) from POU 601 is stored when the kind of the variable is the output variable.

In this way, when PLC 100 executes call instruction code 522 of user program 600 to call POU 601 from library 113, the value (the actual argument value, the default value, and the like) can be set to all the variables (arguments) necessary for the processing before instruction code 543 that is the original processing of POU 601 is executed. Consequently, a runtime error caused by setting no value to the dummy argument during the execution of instruction code 543 can be avoided.

(H-4. Modification of Flowchart of Associative Array for Each Call)

Figure 13:
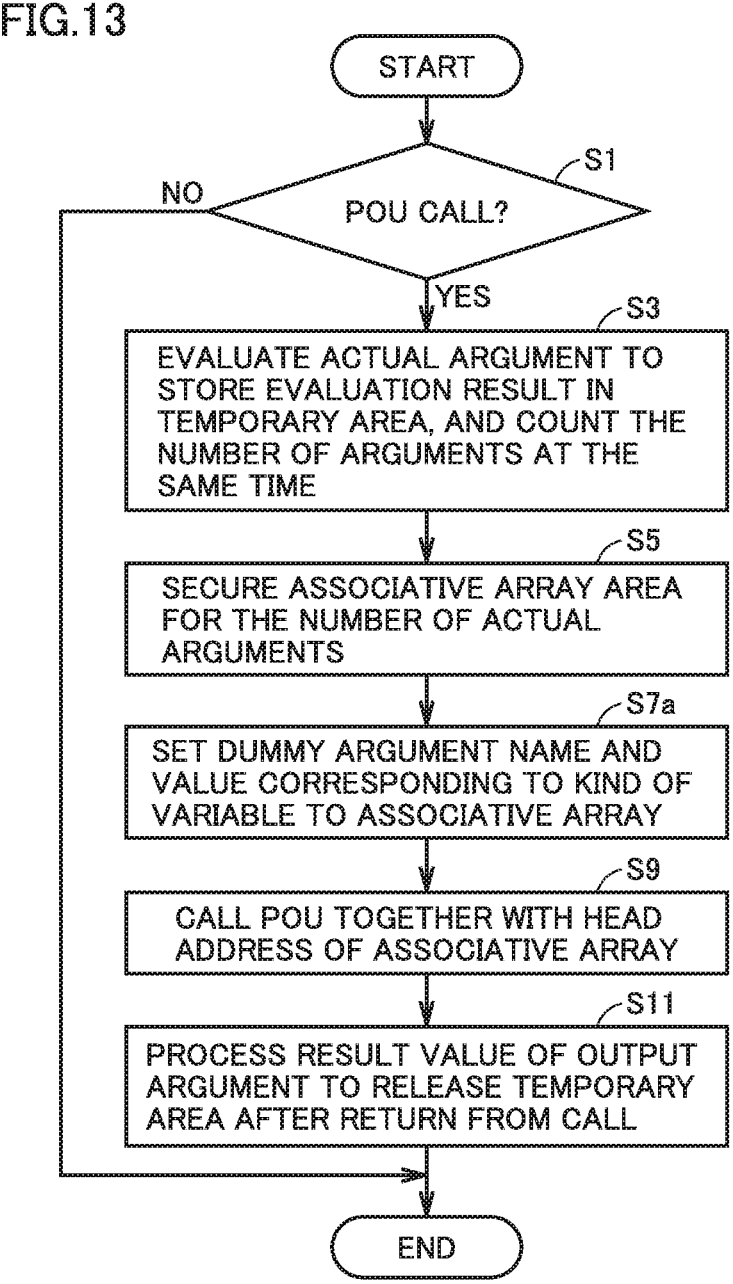
FIG. 13 is a flowchart illustrating another example of the caller-side intermediate code generation processing according to the "associative array for each call" method of the embodiment of the present invention.
Figure 14:
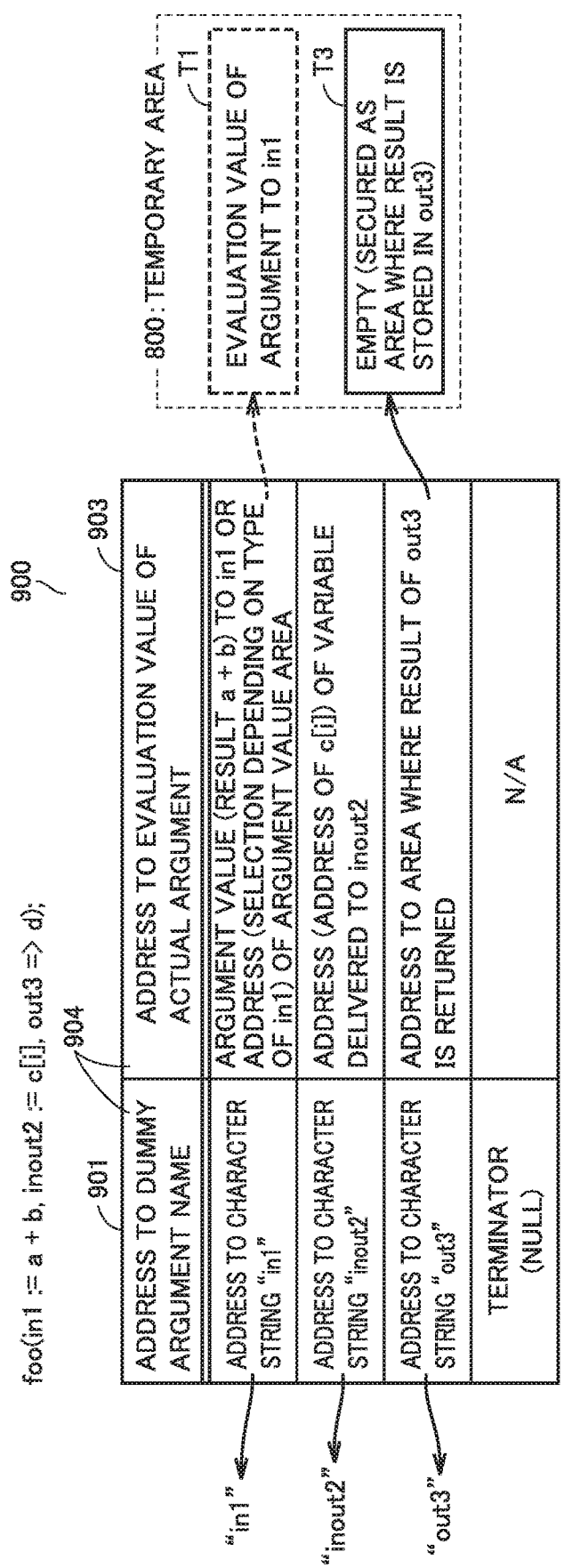
FIG. 14 is a view schematically illustrating an example of the contents of the temporary area and the associative array used in the processing of FIG. 13.
Figure 15:
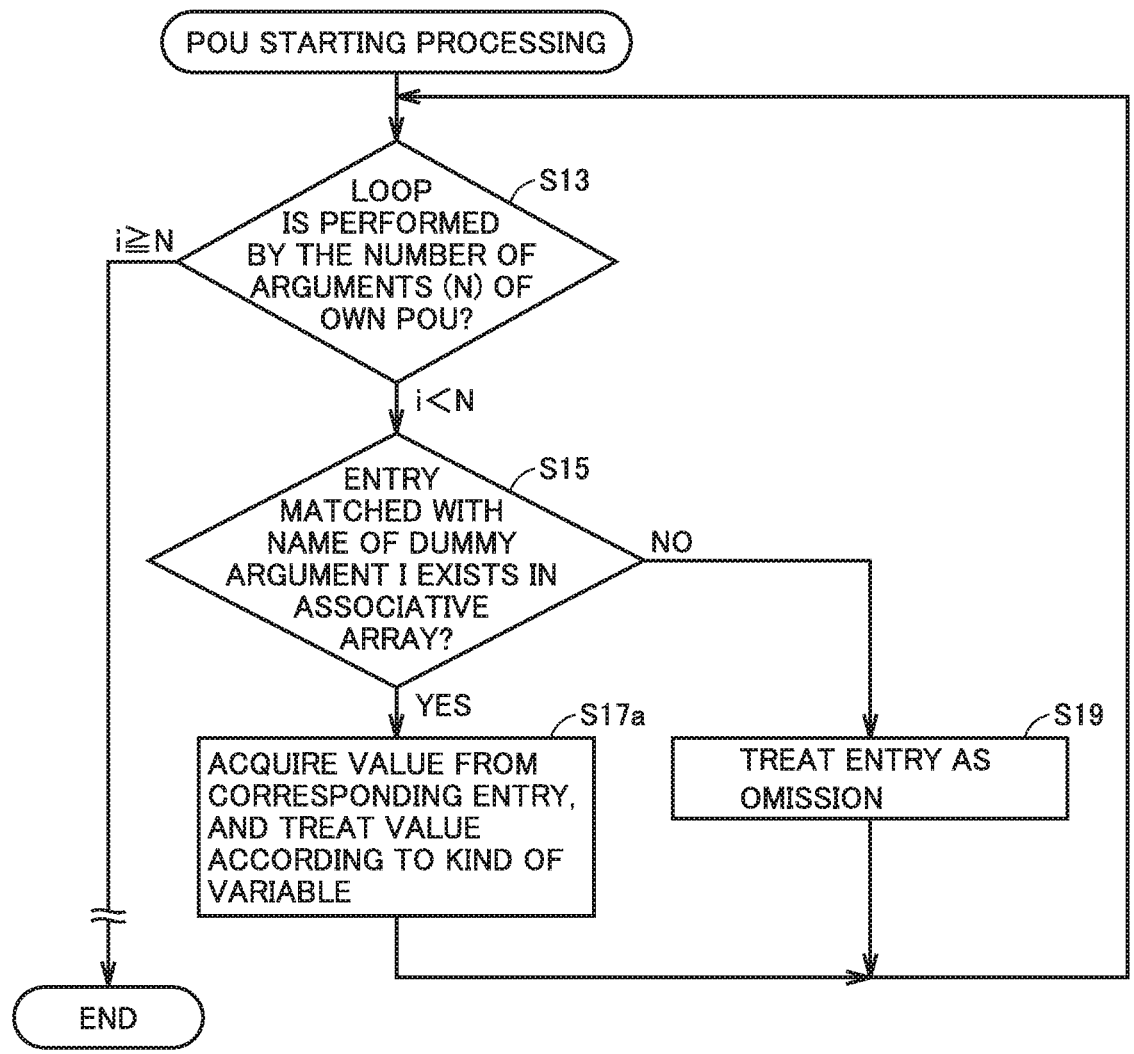
FIG. 15 is a flowchart illustrating another example of the called-side intermediate code generation processing according to the "associative array for each call" method of the embodiment of the present invention.

FIG. 13 is a flowchart illustrating another example of the caller-side intermediate code generation processing according to the "associative array for each call" method of the embodiment of the present invention. FIG. 14 is a view schematically illustrating an example of contents of temporary area 800 and associative array 900 used in the processing of FIG. 13. FIG. 15 is a flowchart illustrating another example of the called-side intermediate code generation processing according to the "associative array for each call" method of the embodiment of the present invention.

In the processing of FIG. 13, because other pieces of processing are the same as those in FIG. 10 although step S7a is different from step S7 in FIG. 10, the description except for step S7a will not be repeated.

In step S7a of FIG. 13, structure code generator 272 generates an instruction code setting address 901 and an address 903 of the area where the actual argument evaluation value is stored to each entry of associative array 900. In step S7a, the instruction code setting the address of the storage area where the value is stored or the value itself is generated as address 903 based on the type of the variable represented by the associated argument.

Specifically, structure code generator 272 generates an instruction code storing not the address but the value of the input variable in1 itself in address 903 when the type of the input variable is a type falling within the area less than or equal to a width of address 903 of associative array 900 for the dummy argument corresponding to the input variable, and structure code generator 272 generates an instruction code storing the address in evaluation value storage area. T1 when the type of the input variable is not the type falling within the area less than or equal to the width of address 903 of associative array 900.

When the dummy argument corresponds to the input and output variable, structure code generator 272 generates an instruction code storing the address (address of c[i]) storing the value of input and output variable inout2 in corresponding address 903. When the dummy argument corresponds to the output variable, structure code generator 272 generates an instruction code storing the address of the area where the output from POU 601 is stored.

With reference to FIG. 15, the processing on the called side will be described below. In the processing of FIG. 15, because other pieces of processing are the same as those in FIG. 12 although step S17a is different from step S17 in FIG. 12, the description except for step S17a will not be repeated. In step S17a of FIG. 15, setting code generator 274 generates an instruction code changing the treatment of the value acquired from associative array 900 with the change of the content stored in the entry of associative array 900 according to the kind of the variable in step S7a described above.

Setting instruction code 532 generated in step S17a includes an instruction code changing the value set to the dummy argument according to the kind of the variable corresponding to the dummy argument. For example, for the input variable, the value is acquired from the entry when the type of the input variable is the type falling within the area less than or equal to the address width, otherwise, the value is treated as the address to area T1 where the evaluation value is stored, and setting instruction code 532 includes an instruction code acquiring the value from area T1. For the input and output variable, setting instruction code 532 includes an instruction code acquiring the address of the area where the value of the variable is stored. For the output variable, setting instruction code 532 includes an instruction code acquiring the address of area T3 where the output (return value) from POU 601 is stored.

In the modifications of FIGS. 13, 14, and 15, the content stored as the data of the actual argument in association information 904 of the entry of the associative array (or obtained from association information 904 of the entry) can be varied by the kind and type of the variable of the dummy argument of called POU 601.

<I. "Associative Array for Each Kind" Method>

Figure 16:
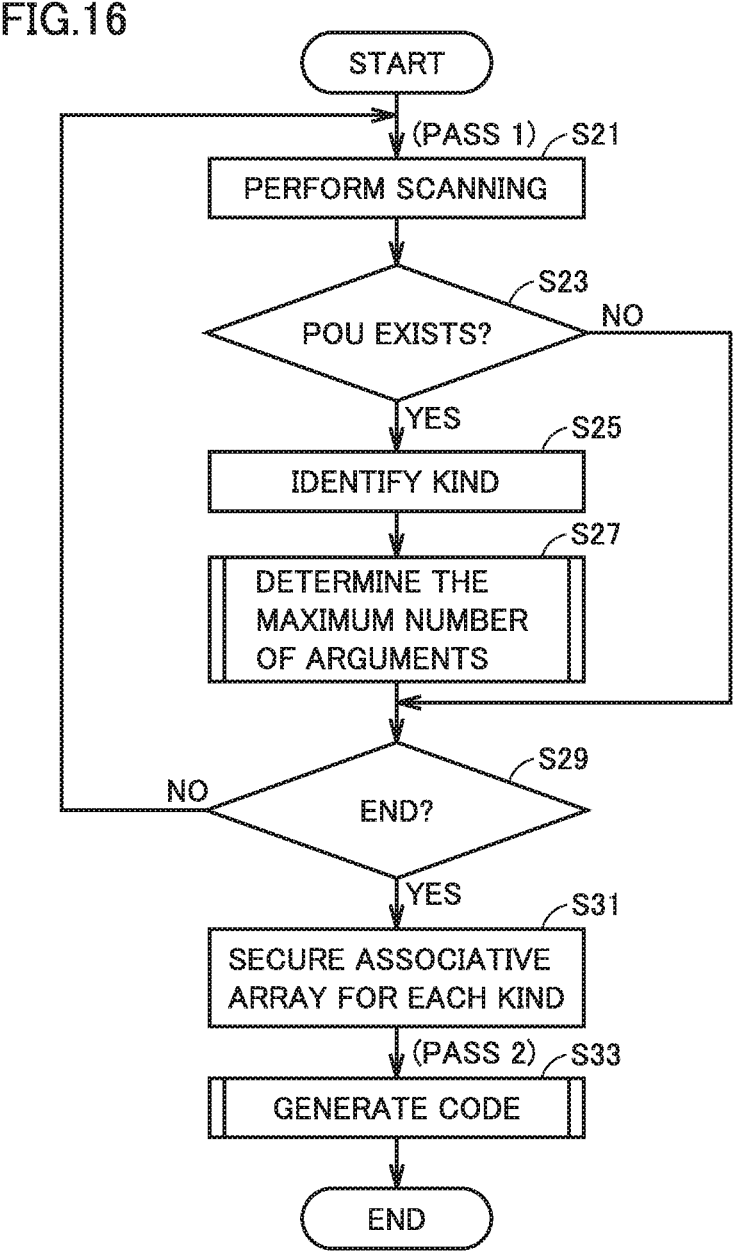
FIG. 16 is a flowchart schematically illustrating an example of intermediate code generation processing according to an "associative array for each kind" method of the embodiment of the present invention.

A method for securing the area of the associative array for each kind of POU 601 called in user program 600 will be described. FIG. 16 is a flowchart schematically illustrating an example of the intermediate code generation processing according to the "associative array for each kind" method of the embodiment of the present invention.

With reference to FIG. 16, compiler 263 scans user program 600 (source code 610) twice. Hereinafter, first-time scan is referred to as pass 1, and second-time scan is referred to as pass 2.

In pass 1, call detector 270 of compiler 263 determines whether call expression 550 is detected (step S23) while scanning user program 600 from, for example, the head (step S21). When call detector 270 does not detect call expression 550 (NO in step S23), the processing proceeds to step S29 (to be described later).

When call detector 270 detects call expression 550 (YES in step S23), compiler 263 identifies the kind of POU 601 from detected call expression 550 (step S25). The type of POU 601 is based on the POU name and the like included in call expression 550.

Compiler 263 determines the maximum number of dummy arguments included in POU 601 for each kind of POU identified from call expression 550 (step S27). Thereafter, call detector 270 determines whether the scanning is performed up to the termination of user program 600 (step S29). When it is determinated that the scanning is not performed up to the termination (NO in step S29), the processing returns to step S21 to continue the scanning.

When call detector 270 determines that user program 600 is scanned up to the termination (YES in step S29), compiler 263 decides the maximum number of dummy arguments for each kind of POU 601.

Structure code generator 272 generates an instruction code 524 securing the area where associative array 900 is stored for each kind of POU 601 (step S31) Specifically, structure code generator 272 generates an instruction code securing the area of the associative array including the entries for the maximum number of dummy arguments of POU 601 belonging to the kind and the entry indicating the termination with respect to the associative array for each kind of POU 601. Consequently, pass 1 ends.

Compiler 263 executes pass 2. In pass 2, user program 600 is scanned, and code generator 271 generates the intermediate code for each POU 601 according to the "associative array for each call" method using associative array 900 corresponding to the kind of POU 601 secured in pass 1 (step S33). Consequently, pass 2 ends.

FIG. 17 is a view schematically illustrating an example of the associative array generated according to the "associative array for each kind" method of the embodiment of the present invention. With reference to FIG. 17, when three kinds of POU 601 of pou1, pou2, and pou3 are detected by scanning user program 600 (source code 610) by pass 1, structure code generator 272 generates a creation instruction code creating associative arrays 910, 920, and 930 corresponding to each kind. Each associative array has the number of entries corresponding to the maximum number of dummy arguments of POU 601 belonging to the corresponding kind.

With reference to FIG. 17, in the generation of the intermediate code in pass 2, structure code generator 272 generates an instruction code setting the value to the associative array every time the POU is called. The generated instruction code is the same as that of the "associative array for each call" method. Call code generator 273 generates the call code using the associative array corresponding to each POU 601. Even in this case, the call code in which the head address of the storage area of the associative array is used is generated similarly to the "associative array for each call" method.

When returning from the processing of POU 601, code generator 271 generates an instruction command initializing (clearing) the contents of the storage areas of associative arrays 910, 920 and 930. For example, the instruction code initializing the associative array includes an instruction code instructing the setting of the terminator or the like to the first entry of associative arrays 910, 920, and 930.

In this way, the instruction code performing the setting and initialization of association information 904 of the associative array is generated each time POU 601 belonging to the kind is called. Consequently, the same associative array can be repeatedly used with respect to each POU 601 belonging to the same kind.

(I-1. Intermediate Code of "Associative Array for Each Kind")

FIG. 18 is a view schematically illustrating an example of the intermediate code generated according to the "associative array for each kind" method of the embodiment of the present invention. The intermediate code in FIG. 18 illustrates an example of an intermediate code 518 generated from the program bar in FIG. 5, which is the caller side of the POU (foo), according to the "associative array for each kind" method of the code generator 271.

Intermediate code 518 includes an instruction code 524 securing the storage area of the associative array including the entries for the maximum number of dummy arguments of POU 601, code 503 of another portion similar to FIG. 6, and a code 528 generated in association with the call of POU 601. Code 528 includes a call instruction code 526 for POU 601, an associative array creation instruction code 525, and an instruction code 527 instructing the initialization of the associative array area. Associative array creation instruction code 525 includes instruction code 5210 and instruction code 5213 in FIG. 8, which are the instruction setting the association information to each entry of the associative array ("foo_arg_area"). Instruction code 5213 is an instruction code instructing the storage of the association information in the associative array. Although the identifier of the associative array is varied, instruction code 5213 is the same as instruction code 5212 in FIG. 8, so that the overlapping description will be omitted.

Instruction code 524 is an instruction assigning the associative array identifier ("foo_arg_area"), and seeming the area where data (for example, NULL) indicating the area (entry) for the maximum number (for example, 4) of arguments and the termination (terminator) of the array (terminator) is stored.

Call instruction code 526 represents an instruction calling POU 601 using the associative array identifier ("foo_arg_area").

Instruction code 527 represents an instruction initializing the storage area of the associative array when the processing of POU 601 ends.

In this way, each time the processing of called POU 601 is completed, the intermediate code according to the "associative array for each kind" method includes instruction code 524 initializing the associative array corresponding to the kind of the POU, which allows the associative array to be shared by the plurality of POUs 601 of the same kind. Thus, as in the intermediate code of the "associative array for each call", the processing of securing the area of the associative array for each call of the POU and the processing of releasing the storage area of the associative array each time the processing of POU 601 ends can be omitted.

In the embodiment, the intermediate code generated by the "associative array for each kind" may include an instruction code securing the storage area of the associative array in a static storage area of PLC 100 in a build unit (generally, a unit in which the file of intermediate code 700 is linked). The static storage area is a storage area where the intermediate code of user program 600 in the build unit is retained until the intermediate code is deleted since the intermediate code is loaded into PLC 100. Thus, in the same build unit, the number of execution times of pass 1 can be decreased to one.

The intermediate code generated by the "associative array for each kind" may include an instruction code permitting the storage area of the associative array to be referred to (or the reading and writing of the data) only from the inside of the build unit, and prohibiting the storage area of the associative array from being referred to (or the reading and writing of the data) from outside of the build unit. Consequently, even when the associative array is held in the static storage area, the data is not read or written from the outside of the build unit, so that an unexpected or unintended change of the data in the associative array can be prevented.

The intermediate code generated by the "associative array for each kind" may include an instruction code performing exclusive control on the associative array used by the same kind of POU 601. By performing the exclusive control on the "associative array for each kind", the same kind of POU 601 can be called in the build unit and executed in parallel.

The intermediate code generated in the "associative array for each kind" may include an instruction code performing the processing of evacuating and returning the content (association information 904) of the associative array and an instruction code calling recursively the same kind of POU 601. Consequently, the same kind of POU can be recursively called while evacuating and returning the content of the associative array.

<J. Intrinsic Function>

FIG. 19 is a view schematically illustrating an example of the format and the content of the call of an intrinsic function 570 according to the embodiment of the present invention.

In the embodiment, the user can describe intrinsic function 570 (the function name is isArgSpecified) of FIG. 19 in POU 601 using program creation unit 261.

As described above, because the default value or the value indicating the error is set to the argument (see step S19) when the actual argument is omitted, although called POU 601 can determine that the omission is performed from the setting value, this determination method depends on the content of setting instruction code 532 (setting code generator 274). On the other hand, in the determination method in which intrinsic function 570 is used, POU 601 can determine the setting content whether the actual argument is set (or omitted) by performing intrinsic function 570 without depending on the content of setting instruction code 532 (setting code generator 274).

Thus, the user describes intrinsic function 570 in POU 601, which allows the user to execute programming performing the explicit processing during the omission of the actual argument based on the determination result (return value) of intrinsic function 570 without depending on the content of setting instruction code 532 (setting code generator 274). In the case where the default value is set when the actual argument is omitted, the setting content indicating whether the actual argument is actually omitted or whether the default value is set to the actual argument (without omitting the actual argument) can be determined using intrinsic function 570.

<K. Program>

A support program performing the processing of compiler 263 including the processing of each flowchart described in the embodiment is stored in the storage unit (ROM 204, RAM 206, HDD 208, recording medium 250, and the like) of support device 200. CPU 202 reads the support program from the storage unit, and executes the support program, whereby compiler 263 including the code generator 271 described in the embodiment can be constructed.

The support program is recorded in a computer-readable recording medium such as a flexible disk, a CD-ROM (Compact Disk-Read Only Memory), a ROM, a RAM, and recording medium 250 attached to support device 200, and can also be provided as a product. Alternatively, the program can be provided by being recorded in a recording medium such as HDD 208 incorporated in support device 200. The program can be provided by being downloaded from a network (not illustrated) through a communication interface.

<L. Modification>

In the above embodiment, structure code generator 272 can generate creation instruction codes 521, 525 even when the argument does not exist in call expression 550. In this case, creation instruction codes 521, 525 include an instruction code instructing the creation of associative array 900 storing only association information 904 having terminator data (for example, NULL) as address 901 of the dummy argument name and the value of N/A as address 902 of the corresponding set value. Setting code generator 274 generates an instruction code performing the processing according to a predetermined specification for associative array 900 storing only association information 904 of the termination data. When the number of arguments of called POU 601 is zero, for example, setting code generator 274 generates an instruction code performing the processing according to a predetermined specification.

<M. Advantage>

In the embodiment, user program 600 (that is, the executable code (intermediate code 700)) can be copied and used between different PLCs 100, namely, binary compatibility of user program 600 can be secured without depending on the kind of POU 601 stored in library 113 of each PLC 100.

Code generator 271 can generate the executable format code (intermediate code 700) having backward compatibility from user program 600. That is, when a change in version upgrade is generated in a processor that executes user program 600 or a program execution environment such as an OS (Operating System) in the control device (for example, the change in the argument of the POU called by the control device), PLC 100 can execute the original executable code (intermediate code 700) under the changed processor or the OS even when the original executable code is not changed to the version corresponding to the changed execution environment.

The compatibility will further be described. FIG. 20 is a view schematically illustrating an example of advantages obtained by the present embodiment. With reference to FIG. 20, when a POU 601-1 in which input arguments are variables in1 to in3 is registered in library 113 and user program 600 includes a call expression 550-1, because POU 601-1 is matched with call expression 550-1 in the number of arguments and the argument name as illustrated in FIG. 20, POU601-1 is called during the execution of user program 600 to execute the unit program as in the conventional case when call instruction code 522 or 526 is executed.

On the other hand, when a POU 601-2 in which the input arguments are variables in1 to in4 are registered in library 113 and user program 600 includes call expression 550-1, POU 601-2 is not matched with call expression 550-1 in the number of arguments and the argument name of the argument of input variable in4 as illustrated in FIG. 20. Thus, because the actual argument corresponding to the dummy argument of input variable in4 does not exist when call instruction code 522 or 526 converted from call expression 550-1 is executed, for example, the default value is set (for example, the instruction codes of step S15 and step S19 in FIG. 12 are executed) on the assumption that the value (the actual argument) to be set to the dummy argument is omitted.

With reference to FIG. 20, when POU 601-2 in which the input arguments are variables in1 to in4 is registered in library 113 and user program 600 includes a call expression 550-2, because POU 601-2 is matched with call expression 550-2 in the number of arguments and the argument name as illustrated in FIG. 20, POU 601-2 is called during the execution of user program 600 to execute the unit program as in the conventional case when call instruction code 522 or 526 converted from call expression 550-2 is executed.

On the other hand, when a POU 601-1 in which the input arguments are variables in1 to in3 are registered in library 113 and user program 600 includes call expression 550-2, POU 601-1 is not matched with call expression 550-2 in the number of arguments and the argument name of the argument of input variable in4 as illustrated in FIG. 20. Thus, when call instruction code 522 or 526 converted from call expression 550-2 is executed during the execution of user program 600, the actual argument corresponding to the dummy argument of input variable in4 is ignored.

As illustrated in FIG. 20, PLC 100 can execute user program 600 while calling POU 601 without depending on the number of arguments and argument names of the dummy arguments included in call expression 550 described in user program 600, and without depending on the number of arguments and argument names of POU 601 registered in library 113. Consequently, in the embodiment, the binary compatibility that is the compatibility of the executable format code of user program 600 and POU compatibility can be provided.

This also facilitates version control of the executable code of each PLC 100. The user can develop user program 600 in support device 200 without being conscious of whether POU 601 registered in library 113 of PLC 100 is a usable version.

<N. Appendix>

The embodiment as described above includes the following technical ideas.

[Configuration 1]

A support device (200) supporting development of a user program (600) to be executed by a control device (100) that controls a control target, the support device including:

a call detector (270) configured to scan the user program and detect a call expression (550) calling a callable unit program (601) configuring the user program from the user program; and a code generator (271) configured to generate a code (700) having a format executable by the control device from the user program, wherein the code generator includes:

a structure code generator (272) configured to generate a creation instruction code creating a structure (900) storing association information (904) associating a name of an argument with a value set to the argument with respect to the call expression;

a call code generator (273) configured to convert the call expression into a call instruction code (522, 526) calling the unit program using an identifier of the structure; and a setting code generator (274) configured to set the value of the association information to the argument when the association information corresponding to the name of the argument is stored in the structure with respect to each argument while the unit program includes at least one argument, and to generate a setting instruction code setting a predetermined value to the argument when the association information is not stored.

[Configuration 2]

The support device according to the configuration 1, wherein the structure code generator generates the creation instruction code creating the structure each time the call detector detects the call expression of the unit program.

[Configuration 3]

The support device according to the configuration 1, wherein the structure code generator generates the creation instruction code creating the structure for each kind of the unit program called by the call expression detected by the call detector.

[Configuration 4]

The support device according to any one of the configurations 1 to 3, wherein the association information includes information (901) indicating the name of the argument and information (902, 903) indicating the value, the information indicating the name of the argument includes an address of a storage area where the name of the argument is stored, and the information indicating the value includes an address of a storage area (800) where the value is stored.

[Configuration 5]

The support device according to the configuration 4, wherein the argument represents a variable used in the user program, and the information indicating the value includes one of the address of the storage area where the value is stored and the value, based on a type of a variable represented by the associated argument.

[Configuration 6]

The support device according to any one of configurations 1 to 5, wherein the unit program includes a function determining a setting content of each argument of the unit program.

[Configuration 7]

The support device according to any one of the configurations 1 to 6, wherein the call code generator converts the call expression into the call instruction code (522, 526) using, as the identifier of the structure, an address of an area where the structure is stored.

[Configuration 8]

The support device according to any one of the configurations 1 to 7, wherein the setting code generator generates an instruction code performing predetermined processing when the unit program does not include the argument.

[Configuration 9]

A support program constructing a support device supporting development of a user program to be executed by a control device that controls a control target, the support program causing a computer to function as:

a call detector configured to scan the user program and detect a call expression calling a callable unit program configuring the user program from the user program; and a code generator configured to generate a code having a format executable by the control device from the user program, wherein the code generator includes:

a structure code generator configured to generate a creation instruction code creating a structure storing association information associating a name of an argument with a value set to the argument with respect to the call expression;

a call code generator configured to convert the call expression into a call instruction code calling the unit program using an identifier of the structure; and a setting code generator configured to set the value of the association information to the argument when the association information corresponding to the name of the argument is stored in the structure with respect to each argument while the unit program includes at least one argument, and to generate an instruction code setting a predetermined value to the argument when the association information is not stored.

It should be considered that the disclosed embodiments are an example in all respects and not restrictive. The scope of the present invention is defined by not the above description, but the claims, and it is intended that all modifications within the meaning and scope of the claims are included in the present invention.

REFERENCE SIGNS LIST

1: PLC system; 11: system bus, 12: power supply unit, 102: processor; 104: chip set, 106: main memory, 108: flash memory, 110: system program, 111 library, 116: external network controller; 118: memory card interface, 120: memory card, 122: internal bus controller, 124: field bus controller, 200: support device, 204: ROM, 206: RAM, 210: keyboard, 212: mouse, 214: display, 216: transfer unit, 217: recording media reader, 218: communication interface, 250: recoding medium, 260: program development unit, 261: program creation unit, 262: program editor, 263: compiler, 270: call detector, 271: code generator, 272: structure code generator, 273: call code generator, 274: setting code generator, 521, 525: creation instruction code, 522, 526: call instruction code, 523: release instruction code, 532: setting instruction code, 550: call expression, 570: intrinsic function, 600: user program, 600A: sequence program, 600B: motion program, 610: source code, 800: temporary area, 900, 910: associative array, 904: association information. T1, T2, T3: area

The invention claimed is:

1. A support device supporting development of a user program to be executed by a control device, storing a callable unit program called by the user program, that controls a control target, the support device comprising a processor configured with a program to perform operations comprising:
 operation as a call detector configured to scan the user program and detect a call expression calling the callable unit program; and
 operation as a code generator configured to generate a code having a format executable by the control device from the user program,
 wherein the processor is configured with the program such that operation as the code generator includes:
  operation as a structure code generator configured to generate a creation instruction code creating a structure storing, for each argument of the call expression, association information associating a name of the argument of the call expression with a value of the argument of the call expression;
  operation as a call code generator configured to convert the call expression into a call instruction code calling the unit program using an identifier of the structure in place of the argument of the call expression; and
  operation as a setting code generator configured to generate a setting instruction code to, for each argument of the callable unit program:
   in response to association information corresponding to a name of the argument of the callable unit program being stored in the structure, set a value of the argument of the callable unit program to be the value associated with the name of the argument stored in the structure; and
   in response to no association information corresponding to the name of the argument of the callable unit program being stored in the structure, set the value of the argument of the callable unit program to be a predetermined default value.

2. The support device according to claim 1, wherein the processor is configured with the program such that operation as the structure code generator comprises generating the creation instruction code creating the structure each time the call detector detects the call expression of the unit program.

3. The support device according to claim 1, wherein the processor is configured with the program such that operation as the structure code generator comprises generating the creation instruction code creating the structure for each kind of the unit program called by the call expression detected by the call detector.

4. The support device according to claim 1, wherein the processor is configured with the program such that
 the structure stores an address of a storage area where the name of the argument of the call expression is stored, and
 the structure stores an address of a storage area where the value of the argument of the call expression is stored.

5. The support device according to claim 4, wherein the processor is configured with the program such that
 the argument of the call expression represents a variable used in the user program, and
 the structure stores one of the address of the storage area where the value of the argument of the call expression is stored and the value of the call expression, based on a type of the variable represented by the associated argument.

6. The support device according to claim 1, wherein the callable unit program includes a function determining a setting content of each argument of the callable unit program.

7. The support device according to claim 1, wherein the processor is configured with the program such that operation as the call code generator comprises converting the call expression into the call instruction code using, as the identifier of the structure, an address of an area where the structure is stored.

8. The support device according to claim 1, wherein the processor is configured with the program such that operation as the setting code generator comprises operation as a processing instruction code generator configured to generate an instruction code performing predetermined processing in response to the callable unit program not including an argument of the call expression.

9. A non-transitory computer-readable storage medium storing a program for causing a computer to execute a method for supporting development of a user program to be executed by a control device, storing a callable unit program called by the user program, that controls a control target, the method comprising:
 scanning the user program and detecting a call expression calling the callable unit program; and
 generating a code having a format executable by the control device from the user program,
 wherein the generating includes:
  generating a creation instruction code creating a structure storing, for each argument of the call expression, association information associating a name of the argument of the call expression with a value of the argument of the call expression;
  converting the call expression into a call instruction code calling the unit program using an identifier of the structure in place of the argument of the call expression; and
  for each argument of the callable unit program, generating a setting instruction to:
   in response to association information corresponding to a name of the argument of the callable unit program being stored in the structure, set a value of the argument of the callable unit program to be the value associated with the name of the argument stored in the structure; and
   in response to no association information corresponding to the name of the argument of the callable unit program being stored in the structure, set the value of the argument of the callable unit program to be a predetermined default value.

\* \* \* \* \*